United States Patent
Cho et al.

(10) Patent No.: US 10,880,667 B1
(45) Date of Patent: Dec. 29, 2020

(54) PERSONALIZED EQUALIZATION OF AUDIO OUTPUT USING 3D RECONSTRUCTION OF AN EAR OF A USER

(71) Applicant: Facebook Technologies, LLC, Menlo Park, CA (US)

(72) Inventors: Sang-Ik Terry Cho, Kirkland, WA (US); Vamsi Krishna Ithapu, Kirkland, WA (US); Pablo Francisco Faundez Hoffmann, Kenmore, WA (US); Majid Mirbagheri, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/560,887

(22) Filed: Sep. 4, 2019

(51) Int. Cl.
*H04S 7/00* (2006.01)
*H04R 5/033* (2006.01)
*G06T 7/50* (2017.01)
*G06T 17/20* (2006.01)

(52) U.S. Cl.
CPC ............... *H04S 7/304* (2013.01); *G06T 7/50* (2017.01); *G06T 17/20* (2013.01); *H04R 5/033* (2013.01); *H04S 7/307* (2013.01); *G06T 2200/08* (2013.01); *G06T 2207/10028* (2013.01); *G06T 2207/20081* (2013.01)

(58) Field of Classification Search
CPC . H04S 7/304; H04S 7/307; G06T 7/50; G06T 17/20; G06T 2200/08; G06T 2207/10028; G06T 2207/20081; H04R 5/033
See application file for complete search history.

(56) References Cited

U.S. PATENT DOCUMENTS

2012/0183161 A1* 7/2012 Agevik .................. H04S 7/302
381/303
2019/0349702 A1* 11/2019 Miller ...................... G06T 7/50

OTHER PUBLICATIONS

Wikipedia, "Head-related transfer function", Ver. Jul. 7, 2019 (Year: 2019).*

* cited by examiner

*Primary Examiner* — David L Ton
(74) *Attorney, Agent, or Firm* — Fenwick & West LLP

(57) ABSTRACT

A method for generating an individualized audio output response for a headset based on a representation of a user's ear. One or more images of a portion of a user's head including at least the user's ear are received. A representation of the user's ear is generated based in part on the one or more images. A simulation of sound propagation from an audio source to the user's ear is performed based on the representation. An individualized audio output response is generated for the user based on the simulation, the individualized audio output response configured to adjust one or more acoustic parameters of audio content provided to the user by the headset.

17 Claims, 15 Drawing Sheets

US 10,880,667 B1

PERSONALIZED EQUALIZATION OF AUDIO OUTPUT USING 3D RECONSTRUCTION OF AN EAR OF A USER

FIELD OF THE INVENTION

This disclosure relates generally to artificial reality systems, and more specifically to generating an individualized equalization filter for a user.

BACKGROUND

Existing headsets, such as artificial reality (AR) and virtual reality (VR) headsets, often provide audio content to a user using a plurality of transducers. Sound propagation from the transducers to the user's ears, however, can vary based on the anatomical features of the user's ears and/or head. For example, differences in ear size and shape from user to user can affect the sound generated by the headset and perceived by a user, which can negatively impact a user's audio experience. Current audio systems are insufficient for delivering high-fidelity audio content as they may not consider variation in anatomical features from user to user and inconsistency of fitment of a headset from user to user. Thus, a method for adjusting the audio output that compensates for variations in anatomical features and fitment inconsistencies such that audio content provided by a headset is customized to a user is needed.

SUMMARY

A system and method for generating an individualized equalization filter to enhance a user's audio experience based on images of the user's ear is disclosed. A representation of at least a portion of a user's head including at least the user's ear is generated using one or more images of the user's head. The images may include images of the user (e.g., of the user's head, of the user's ear) and/or images of the user wearing a headset. The headset can include a plurality of transducers for providing audio content to the user. The representation may be a 3-dimensional mesh model. Based on the representation, a simulation numerically simulating how sound propagates from an audio source (e.g., a transducer array of a headset) to the user's ear is performed. The simulation is used to generate the equalization filter for the user. The equalization filter is then used adjust one or more acoustic parameters of the audio output of the user (e.g., wavelength, frequency, volume, pitch, balance, etc.) to generate a target response at the ear for the user so that the user perceives the audio output as a creator of the audio output intended it to be heard. The equalization filter can also be appended to the user's social networking profile.

Figure 1A:
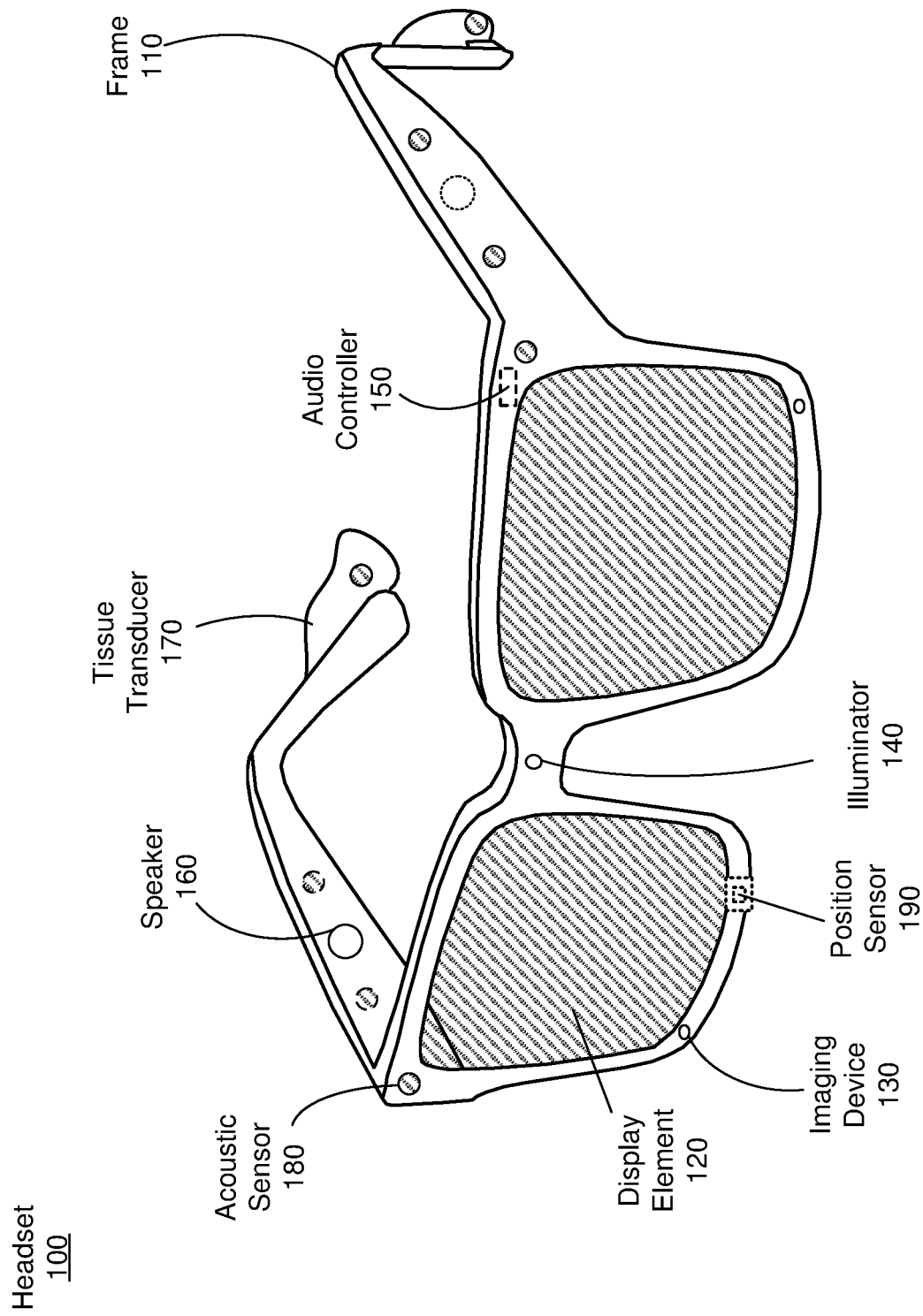
FIG. 1A is a perspective view of a first embodiment of a headset, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

A headset, such as an artificial reality (AR) headset, includes one or more transducers (e.g., speakers) for providing audio content to a user. Sound propagation from the transducers to a user's ears, however, can vary from user to user and device to device. In particular, an audio output at the ear of the user can vary based on the anthropometric features of the user's ear and/or head. Anthropometric features are physical characteristics of a user (e.g., ear shape, ear size, ear orientation/position on head, head size, etc.). Additionally, the fit of a headset can vary based on the anthropometric features, also affecting the audio output response. As such, it may be useful to adjust the audio content provided to the user by a headset such that the user experiences a personalized audio output response to enhance user experience and provide high quality content to the user. Accordingly, an equalization filter that adjusts one or more acoustic parameters of the audio output (e.g., wavelength, frequency, volume, pitch, balance, other spectral content, acoustic time delay, etc.) is generated based on the user's ear. The equalization filter, when applied to the audio content, adjusts the audio content to a target response at the ear of the user so that the user perceives the audio content as a creator of the audio content intended it to be heard. In one embodiment, the target response is associated with predetermined values (or a range of acceptable values) for each of a set of acoustic parameters. The predetermined values (or range of acceptable values) for each of the set of acoustic parameters correspond to a relatively high acceptable threshold of sound quality that a content creator intended the audio content to be perceived by the user.

In one embodiment, an imaging system (e.g., mobile device of the user, etc.) captures one or more images of a user of a headset to gather anthropometric information associated with the user. The imaging system may capture image data (e.g., still image data or video image data) of the user's ear, the user's head, and/or the user wearing a headset. In one embodiment, the one or more images are each a frame from video captured of the user's ear, the user's head, and/or the user wearing the headset. The headset may be a virtual reality (VR) headset, an AR headset, or some other headset configured to provide audio content to a user. The headset can include a plurality of transducers for providing the audio content, and the positions of the transducers may be known. The dimensions of the headset may also be known. In some embodiments, the headset includes one or more visual markers for determining position information relative to the user's head. For example, the headset can include markers positioned along its frame (e.g., along each temple arm). The position of each marker relative to the other markers and the headset is known. In some embodiments, each marker is a unique size and/or shape.

An equalization system receives one or more images of the user (e.g., from the imaging system, from a headset, etc.) to generate a customized equalization filter for the user. In one embodiment, the imaging system provides the one or more images to the headset and the headset provides the one or more images to the equalization system. The equalization system identifies features (e.g., shape, dimensions) of the user's ear based on the received images. In some embodiments, the equalization system extracts depth information associated with the images and generates a 3-D representation of the user's ear based on the extracted depth information and identified features. The equalization system can generate the 3-D representation using a machine learned model, and in some embodiments, the 3-D representation includes a representation of the headset. The equalization system performs a simulation of audio propagation from audio source (e.g., the transducer array of the headset) to the 3-D representation of the user's ear. Based on the simulation, the equalization system can predict the audio output at the ear of the user. Based on a difference between a target audio response and the predicted audio output at the ear of the user, an equalization filter is generated for the user. In one embodiment, the equalization filter is generated based on transfer function as a ratio between two complex frequency responses (i.e., the target response and the predicted response). The equalization filter adjusts one or more acoustic parameters of the audio output (e.g., wavelength, frequency, volume, pitch, balance, other spectral content, acoustic time delay, etc.) based on the user's ear to generate a target response at the ear of the user so that the user perceives the audio output as a creator of the audio output intended it to be heard. In some embodiments, the equalization system generates an audio profile for the user prescribing an amount of compensation for the one or more acoustic parameters based on the equalization filter.

In another embodiment, the equalization system uses a machine learning model to predict an audio output at an ear of a user. The equalization system receives one or more images (e.g., from the imaging system) and extracts one or more features describing the user's ear based on the images. The equalization system can use machine learning techniques, imaging techniques, algorithms, or any other models for extracting features of the user's ear based on the images. The equalization system uses a machine learned model to determine an audio output at the ear of the user based on the extracted one or more features. In one embodiment, the model is trained using images of other user's ears/heads with previously identified features (e.g., identified by a model, by a human) and a known audio output at the ear for each user. Based on a difference between a target audio response and the predicted audio output at the ear of the user, an equalization filter is generated for the user. The equalization filter adjusts one or more acoustic parameters of the audio output (e.g., wavelength, frequency, volume, pitch, balance, other spectral content, acoustic time delay, etc.) based on the user's ear to generate a target response at the ear of the user so that the user perceives the audio output as a creator of the audio output intended it to be heard.

The equalization system can provide the generated individualized equalization filter to the headset. As such, the individualized equalization filter can modify one or more acoustic parameters of audio content provided to a user by the headset such that the audio content is customized to the user. The individualized equalization filter improves audio experience by reducing variations in audio output due to differences from user to user and device to device. Additionally, the individualized equalization filter can be appended to a profile of a user (e.g., a social networking profile) such that the user does not need to re-perform calibration of the device during subsequent use.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Example Headsets

FIG. 1A is a perspective view of a first embodiment of a headset, in accordance with one or more embodiments. In some embodiments, the headset is a near eye display (NED) or eyewear device. In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece). In some embodiments, the frame 110 includes one or more visual markers, described in greater detail below in relation to FIGS. 6A-6B.

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

Note that in some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the audio controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more Red, Green, Blue, (RGB) cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 10.

Figure 1B:
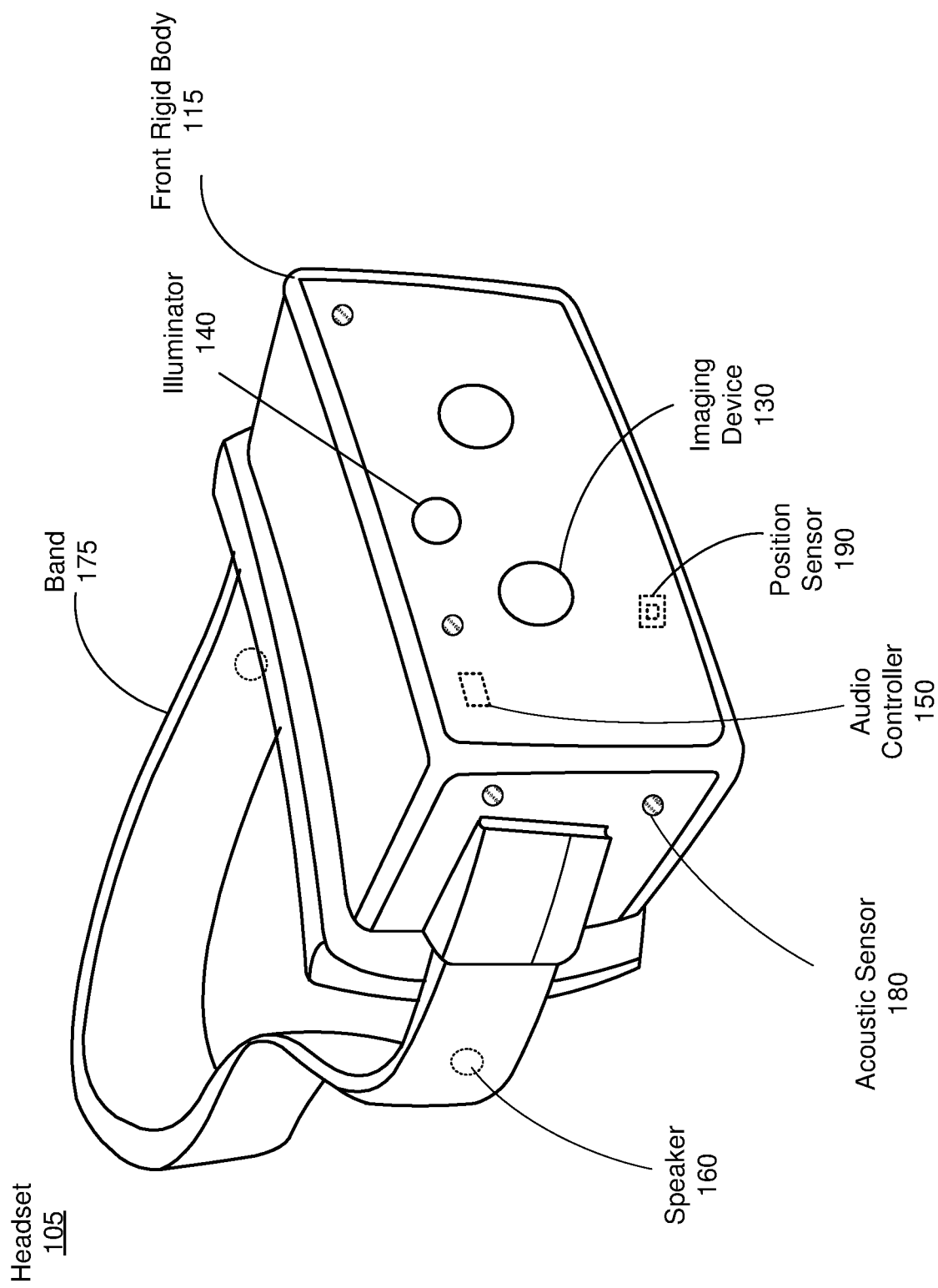
FIG. 1B is a perspective view of a second embodiment of a headset, in accordance with one or more embodiments.

FIG. 1B is a perspective view of a second embodiment of a headset implemented as a head-mounted display (HMD), in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190.

System Environment for Providing Personalized Audio Content

Figure 2:
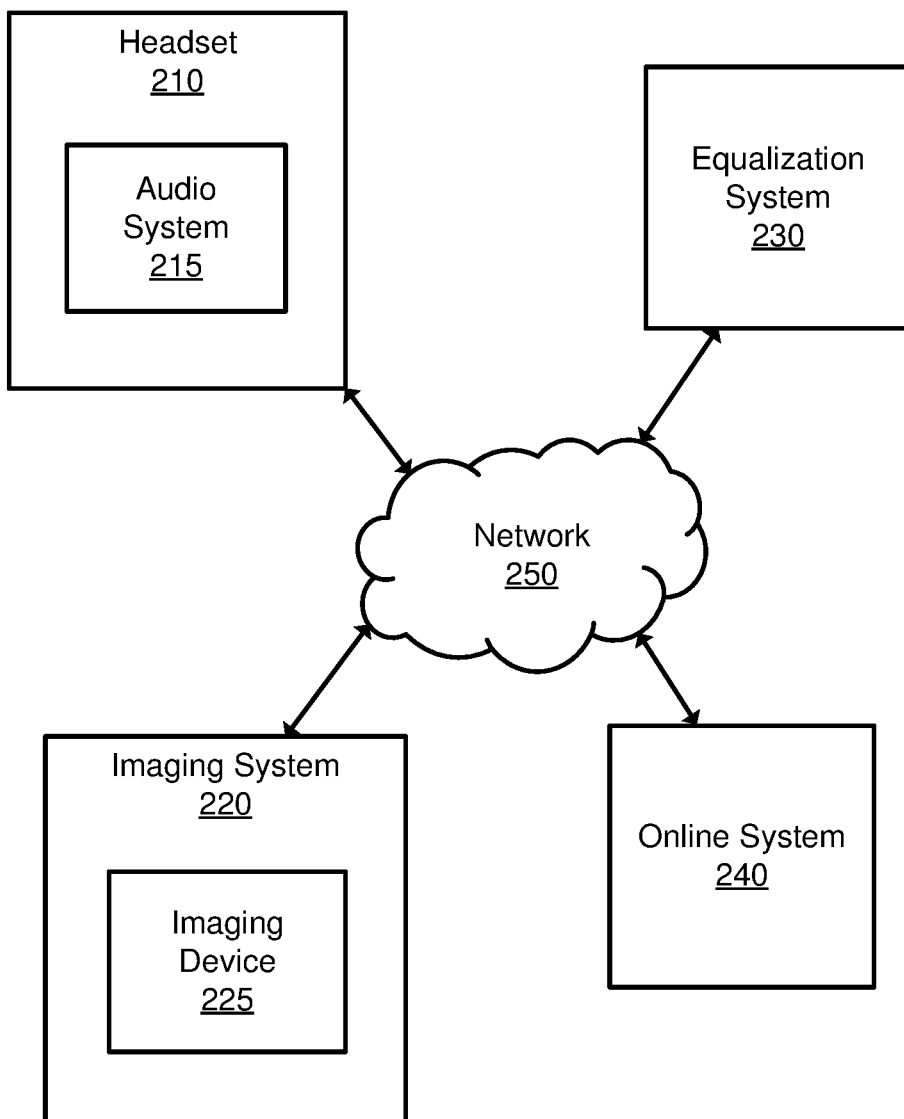
FIG. 2 illustrates a system environment for providing audio content to a device, in accordance with one or more embodiments.

FIG. 2 illustrates a system environment for providing individualized audio content via a headset to a user, in accordance with one or more embodiments. The system environment 200 includes a headset 210, an imaging system 220, an equalization system 230, and an online system 240 connected via a network 250. The system environment 200 can include fewer or additional components than described herein. Additionally, the structure and/or functions of the components may be different than described herein.

The headset 210 is a device (e.g., headset 100, headset 105) configured to be worn by a user at the user's head region. The headset 210 includes an audio system 215 configured to transmit audio content to a user wearing the headset 210. The audio system 215 can include one or more transducers (e.g., speakers) for providing audio content to the user. The audio system 215 is described in greater detail below in relation to FIG. 10. In some embodiments, the headset 210 includes additional components (e.g., a display system, haptic feedback system) for providing other types of content (e.g., digital content, haptic content) to a user. Additionally, the headset 210 can include one or more visual markers for determining a position of the headset 210 relative to a user wearing the device. The markers may be positioned along the frame (e.g., frame 110) of the headset 210. The positions of the markers relative to the other markers and the headset 210 are known. The markers are described in greater detail below in relation to FIGS. 6A-6B.

The imaging system 220 includes an imaging device 225 configured to capture one or more images of at least a portion of the user's head, the headset 210, and/or the user wearing the headset 210. The imaging device 225 may be any suitable type of sensor such as a multispectral camera, a stereo camera, a CCD camera, a single lens camera, a hyperspectral imaging system, a LIDAR system (light detection and ranging system), a DCA, a dyanmometer, an IR camera, some other imaging device, or some combination thereof. As such, the imaging device 225 can capture an RGB image, a depth image (e.g., a 3-D image captured using structured light camera, stereoscopic camera, etc.), or some other suitable type of image. In one embodiment, the imaging device 225 is a user device with image capture capabilities (e.g., smartphone, tablet, laptop). The imaging device 225 can additionally or alternatively capture videos. Although in FIG. 2 the imaging system 220 is shown as separate from the headset 210, in alternative embodiments the imaging system 220 is included in the headset 210. For example, the imaging device 225 may be a camera coupled to the headset 210 or a camera integrated in the headset 210 (e.g., imaging device 130).

In some embodiments, the imaging system 220 can apply one or more imaging techniques (e.g., stereo triangulation, sheet of light triangulation, structured light analysis, time-of-flight analysis, interferometry) to determine depth information associated with an image captured by the imaging device 225. In a specific embodiment, the imaging system 220 includes the DCA that captures images of the user, and the DCA determines depth information for the head of the user using the captured images. The depth information describes distances between surfaces in the captured image and the DCA. The DCA may determine depth information using one or more of: stereo vision, photometric stereo, time-of-flight (ToF), and structured light (SL). The DCA can compute the depth information from the captured images, or send the captured images to another component (e.g., equalization system 230) to extract the depth information. In embodiments where the imaging system 220 does not include a DCA, the imaging system 220 may provide the captured images to the equalization system 230 or some other device and/or console to determine depth information.

The equalization system 230 generate an equalization filter for a user that adjust one or more acoustic parameters of audio content provided to the user via the headset 210 so that the audio output of the headset 210 matches a target response at the user's ear. In one embodiment, the equalization filter is generated based on a difference between the audio output at the ear entrance point (EEP) or drum reference point (DRP) and a target response. In this embodiment, the EEP refers to the entrance position of the ear canal and the DRP refers to the location of the ear drum. The target response and where it is physically defined may differ according to the type of audio material presented. In one embodiment, the target response may be a flat frequency response as measured at the EEP. In one embodiment, the equalization filter is generated based on transfer function as a ratio between two complex frequency responses (i.e., the target response and the predicted response).

Figure 3:
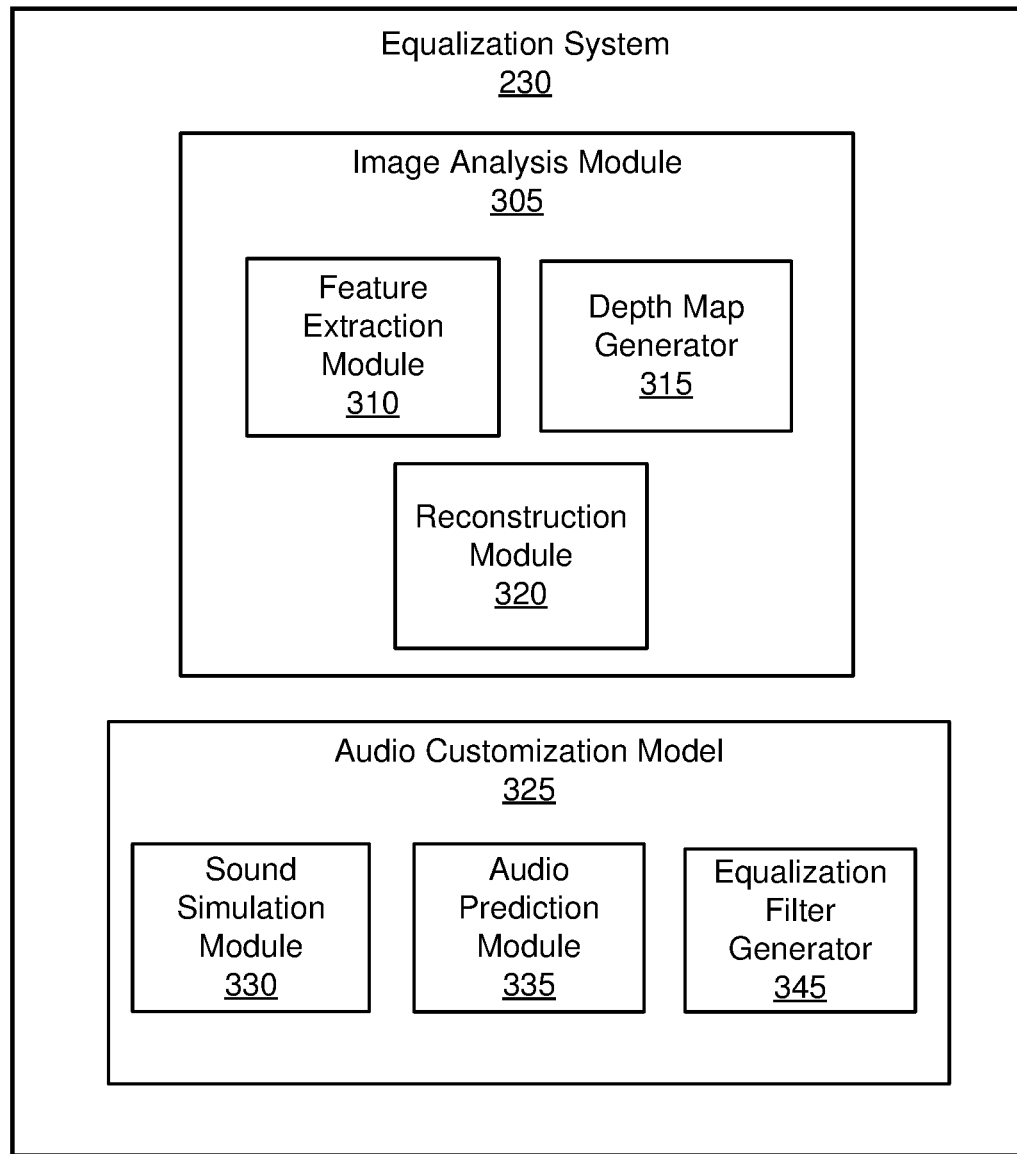
FIG. 3 illustrates an equalization system, in accordance with one or more embodiments.

Thus, the equalization filter adjusts the audio output based on the user's ear so that the user hears the audio output the way a content creator intended the audio output to be heard. Although in FIG. 2 the equalization system 230 is shown as separate from the headset 210, in some embodiments the equalization system 230 may be included in the headset 210. In some embodiments, the equalization system 230 generates a representation of at least a portion of a user's head (e.g., an ear) based on images and/or videos received from the imaging system 220. The equalization system 230 can simulate an audio output at the ear of the user (e.g., from the headset 210) based on the representation and determine an equalization filter for the user based on a difference between the audio output at the ear of the user and a target response. The target response is how a content creator intends the sound to be heard by the user that would be standard if it were not for differences in ear shape and fitment. The target response then is an ideal version of the audio output of a highest achievable sound quality. Thus, the equalization filter prescribes an amount of compensation for one or more acoustic parameters of the audio content provided to the user via the headset 210 to account for the differences in ear shape and fitment so that the user hears a version of the audio output that is a close as reasonably possible to the target response. The equalization system 230 is described in greater detail below in relation to FIG. 3.

The online system 240 maintains user profile information and content to be presented to a user. For example, the online system 240 may be a social networking system. In some embodiments, the online system 240 stores a profile of the user of the headset 210. As such, the equalization system 230 can transmit an audio profile that includes one or more equalization filters to the online system 240, and the online system 240 can store the audio profile with the equalization filters with the online profile of the user. The online system 140 can store an individualized equalization filter corresponding to one or more devices for a single user. For example, the online system 140 can store an individualized equalization filter for headset 100 and another individualized equalization filter for headset 105 for a user. Accordingly, the equalization filter for each device is retrievable by headset 100 and headset 105 who can retrieve and use the equalization filter when providing content to the user. As such, the user can use the headset 210 without re-performing the process for generating the individualized equalization filter.

The network 250 may be any suitable communications network for data transmission. The network 250 is typically the Internet, but may be any network, including but not limited to a Local Area Network (LAN), a Metropolitan Area Network (MAN), a Wide Area Network (WAN), a mobile wired or wireless network, a private network, or a virtual private network. In some example embodiments, network 250 is the Internet and uses standard communications technologies and/or protocols. Thus, network 250 can include links using technologies such as Ethernet, 802.11, worldwide interoperability for microwave access (WiMAX), 3G, 4G, digital subscriber line (DSL), asynchronous transfer mode (ATM), InfiniBand, PCI express Advanced Switching, etc. In some example embodiments, the entities use custom and/or dedicated data communications technologies instead of, or in addition to, the ones described above.

Equalization System

As described above, the equalization system 230 is configured to generate an individualized equalization filter for a user of a headset 210. The equalization system 230 includes an image analysis module 305 and an audio customization model 325. In other embodiments, the equalization system 230 can include fewer or greater components than described herein. Additionally, the functionality of the components may be distributed differently than described below.

The image analysis module 305 includes a feature extraction module 310 configured to extract information from one or more images captured by the user of the user's head and/or ears. The feature extraction module 310 receives images from one or more components of the system environment 200 (e.g., the headset 210, imaging system 220). The images may be of a portion of a user's head (e.g., an ear), a portion of a user's head while the user is wearing a headset (e.g., the headset 100) or a head mounted display (e.g., the headset 105). The feature extraction module 310 can extract information (e.g., depth information, color information) from the images and apply one or more techniques and/or models to determine features (e.g., dimensions, shapes) describing a user's ear and/or head. Examples include range imaging techniques, machine learning models (e.g., a feature identification model), algorithms, etc. In one embodiment, the feature extraction module 310 extracts anthropometric features describing physical characteristics of the user (e.g., ear dimensions, ear shape, head size, etc.).

In some embodiments, the feature extraction module 310 is trained using a machine learning model. The feature extraction module 310 can be trained using images of other users with previously identified features. For example, the plurality of images may be labeled (e.g., by a human, by another model) with identified features of a user's ear and/or head (e.g., earlobe size and shape, position of ear on head, etc.). The image analysis module 305 can use the images and associated features to train the feature extraction module 310.

The image analysis module 305 additionally includes a depth map generator 315 configured to generate one or more depth maps based on the information (e.g., depth information) extracted by the feature extraction module 310. The depth map generator 315 can create a depth map of at least a portion of the user's head and identify the relative position of the user's features. The depth map indicates the position or spatial relationship between the features of interest (e.g., ears) from the images of the user's head. For example, the depth map may indicate the distance between the user's left ear and right ear or the position of the user's ears relative to other features such as eyes and shoulders. In a similar manner, the depth map generator 315 may be used to create a depth map of the user's head wearing a headset from images of the head wearing the headset. In some embodiments, the depth map generator 315 may be used to create a depth map of the headset using images received of the headset in isolation (i.e., not being worn by the user).

The reconstruction module 320 generates a 3-D representation of at least a portion of a user's head based on the features extracted by the feature extraction module 310 and/or the depth map generated by the depth map generator 315. More specifically, the reconstruction module 320 may generate a representation of one or both ears of the user. In one example, the reconstruction module 320 generates a representation of one ear (e.g., left ear) and generates a mirrored representation of the other ear (e.g., right ear). Additionally, or alternatively, the reconstruction module 320 can generate a 3-dimensional mesh representation of a user's head describing, for example, the position of features of the user's head such as eyes, ears, neck, and shoulders. The reconstruction module 320 may combine the features of the user's head with the features of the headset 210 to obtain a representation of the user's head wearing the headset. In some embodiments, a representation of the headset 210 may be predetermined since the headset 210 worn by the user may have a unique known identifier to identify the device. In some embodiments, the headset 210 worn by the user may be identified from images of the device taken when worn using the imaging device 225.

In some embodiments, the reconstruction module 320 generates a PCA-based representation of the user based on head images of human test subjects wearing a test headset and the measured audio output at the ears of each test subject. In the PCA-based representation, the user's head or a feature of the user's head (e.g., ear shape) is represented as a linear combination of the principal components multiplied with corresponding PCA coefficients. For this purpose, the reconstruction module 320 receives the images and measured audio output at the ears of users from a set of test transducers (e.g., speaker array), for example, from a database. Based on the received images of the test subjects (e.g., 500-215 test subjects), the reconstruction module 320 performs principal component analysis (PCA) which uses orthogonal transformation to determine a set of linearly uncorrelated principal components. For example, the orientation of the headset on the ear of the test subjects may be the focus of the PCA.

The reconstruction module 320 can generate a PCA model to determine PCA-based geometry, discussed below with respect to FIGS. 8A-8B. Although the PCA model is described as being generated and executed in the equalization system 230, the PCA model may be executed on a separate computing device. In such case, the result of the PCA is processed and provided to the reconstruction module 320 for processing a user's PCA-based representation.

The audio customization model 325 is configured to predict an audio output at the ear for a user and generate an individualized equalization filter for the user based on a difference between the audio output at the ear and a target response. The audio customization model 325 includes a sound simulation module 330, an audio prediction module 335, and an equalization filter generator 345. In other embodiments, the audio customization model 325 can include additional components not described herein.

The sound simulation module 330 simulates the audio output from an audio source (e.g., a speaker, a speaker array, transducer of the headset, etc.) at the ear of the user using the representation generated by the reconstruction module 320. In one example, the sound simulation module 330 produces the simulated audio output at the ear of the user based on the representation of at least a portion of the user's head. In another example, the sound simulation module 330 produces the simulated audio output at the ear of the user based on the representation of at least a portion of the user's head wearing the headset 210 (e.g., headset 100, headset 105). Additionally, the headset 210 in the representation may include a plurality of transducers (e.g., speakers), and for the transducers in the representation (or some subset thereof), the sound simulation module 330 simulates propagation of sound from the transducers to the user's ear. The sound simulation module 330 may also simulate the audio output at one or both ears of the user.

In one embodiment, the sound simulation module 330 is a numerical simulation engine. To obtain the simulated audio output at the ear, the sound simulation module 330 may use various simulation schemes such as (i) a boundary element method (BEM) described, for example, in Carlos A. Brebbia et al., "Boundary Element Methods in Acoustics," Springer; 1 ed., ISBN 1851666796 (1991) and Gumerov N. A. et al., "A broadband fast multipole accelerated boundary element method for the three dimensional Helmholtz equation," J. Acoust. Soc. Am., vol. 125, issue 1, pp. 191-205 (2009), (ii) a finite element method (FEM) described, for example, in Thompson, L. L., "A review of finite-element methods for time-harmonic acoustics," J. Acoust. Soc. Am., vol. 119, issue 3, pp. 1315-1330 (2006), (iii) a finite-difference time-domain (FDTD) method described, for example, in Taflove, A. et. Al. "Computational Electrodynamics: The Finite-Difference Time-Domain Method," Third Edition; chap. 1,4., Artech House Publishers (2005), and Yee, K., "Numerical solution of initial boundary value problems involving Maxwell's equations in isotropic media," IEEE Transactions on Antennas and Propagation, vol. 14, issue 3, pp. 302-307 (1966), (iv) Fourier Pseudo-Spectral Time Domain (PSTD) method described, for example, in Sakamoto, S. et al. "Numerical analysis of sound propagation in rooms using the finite difference time domain method," J. Acoust. Soc. Am., vol. 120, issue 5, 3008 (2006), and Sakamoto, S. et al. "Calculation of impulse responses and acoustic parameters in a hall by the finite-difference time-domain method," Acoustical Science and Technology, vol. 29, issue 4 (2008), the contents of which are incorporated by reference herein in their entirety.

The audio prediction module 335 is configured to predict features of an audio output at the ear of a user of a headset 210, such as spectral content and acoustic group delay. The audio prediction module 335 can determine the predicted audio output at the ear based on features extracted by the feature extraction module 310, a representation of at least a portion of a user's head generated by the reconstruction module 320, and/or simulation performed by the sound simulation module 330. The predicted audio output at the ear may be the simulated audio output at the ear generated by the sound simulation module 330. Alternatively, the audio prediction module 335 determines the predicted audio output at the ear using a machine learning model, described in greater detail below in relation to FIGS. 9A-9B. For example, the audio prediction module 335 can input the features extracted by the feature extraction module 310 to a machine learning model configured to determine the audio output at the ear based on the features.

The audio prediction module 335 can be trained using one or more machine learning techniques directly from input data of the images and videos of the head and ear geometry. In one embodiment, the audio prediction module 335 is periodically retrained at a determined frequency of time. The audio prediction module 335 may be trained using feature vectors of a positive training set and a negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, boosted stumps, nearest neighbors, k nearest neighbors, kernel machines, probabilistic models, conditional random fields, Markov random fields, manifold learning, generalized linear models, generalized index models, kernel regression, or Bayesian regression—may be used in different embodiments. Training the audio prediction module 335 is described in greater detail below in relation to FIG. 9A.

The equalization filter generator 345 generates an equalization filter customized to a user. In one embodiment, the equalization filter generator 345 generates the equalization filter based on the predicted audio output at the ear of the user predicted by the audio prediction module 335. In another embodiment, the equalization filter generator 345 generates the equalization filter based on the audio output at the ear of the user simulated by sound simulation module 330. As described elsewhere herein, the equalization filter is configured to adjust one or more acoustic parameters of the audio output for the user when applied to the audio output by the headset 210. For example, the equalization filter can be configured to adjust other acoustic parameters such pitch, dynamics, timbre, etc. The equalization filter may be a high pass filter, a low pass filter, a parametric individualized equalization filter, a graphic equalization filter, or any other suitable type of individualized equalization filter. In some embodiments, the equalization filter generator 345 selects an equalization filter from a group of existing equalization filters, adjusts parameters of an existing equalization filter, generates a new equalization filter, or adjusts an equalization filter previously generated by the equalization filter generator 345 based on the predicted audio output at the ear of the user. The equalization filter generator 345 can provide the equalization filter to headset 210, and the headset 210 can employ the equalization filter to provide individualized audio content to a user. Additionally, or alternatively, the equalization filter generator 345 can provide the equalization filter to the online system 240 to store the equalization filter in association with the user's profile of the online system 240.

Example Methods

Figure 4A:
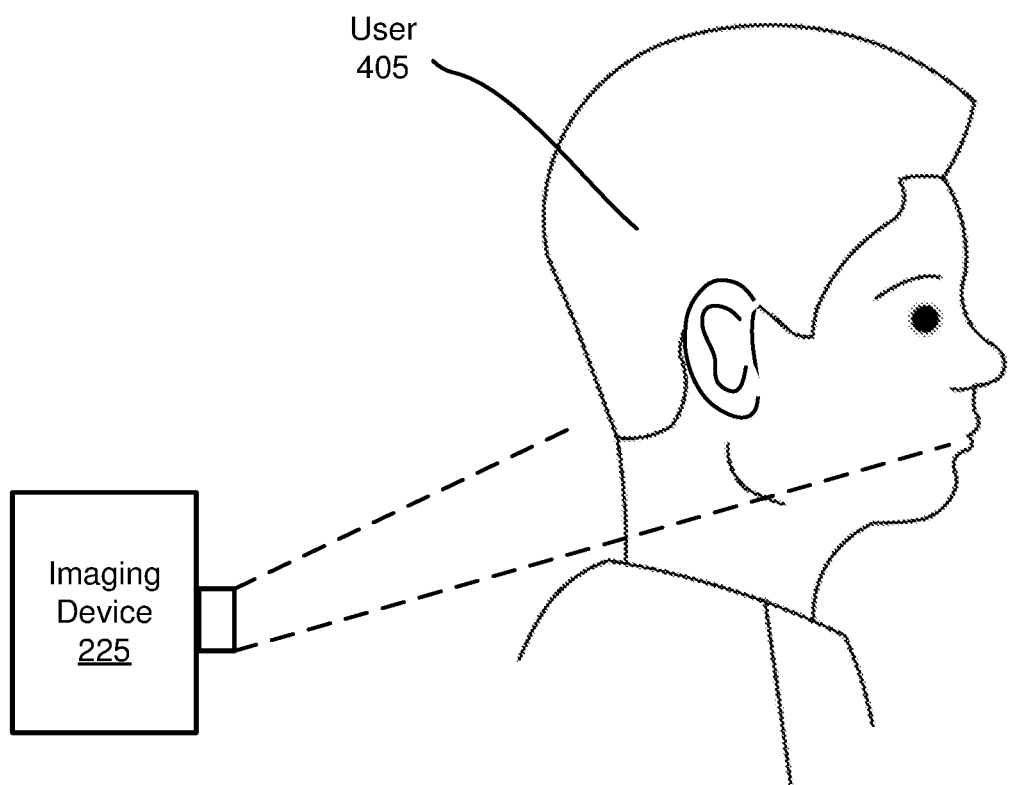
FIG. 4A is an example view of an imaging device capturing an image of a head of a user, in accordance with one or more embodiments.

FIG. 4A is an example view of an imaging device 225 capturing an image of a head of a user 405, in accordance with one or more embodiments. In the embodiment of FIG. 4A, the imaging device 225 captures an image including at least an ear of a user. The imaging device 225 can additionally capture images of the user's head at different angles and orientations. For example, the user 405 (or some other party) can position the imaging device 225 in different locations relative to his/her head, such that the captured images cover different portions of the head of the user 405. Additionally, the user 405 may hold the imaging device 225 at different angles and/or distances relative to the user 405. For example, the user 405 may hold the imaging device 225 at arm's length directly in front of the user's 405 face and use the imaging device 225 to capture images of the user's 405 face. The user 405 may also hold the imaging device 225 at a distance shorter than arm's length with the imaging device 225 pointed towards the side of the user's 405 head to capture an image of the user's 405 ear and/or shoulder. In some embodiments, the imaging device 225 is positioned to capture both an image of the left ear of the user and the right ear of the user. Alternatively, the imaging device 225 can capture a 180-degree panoramic view of the user's head such that both ears are captured in a single image or video.

In some embodiments, the imaging device 225 uses a feature recognition software and captures an image automatically when features of interest (e.g., ear, shoulder) are recognized. Additionally, or alternatively, the imaging device 225 can prompt the user to capture an image when a feature of interest is in the field of view of the imaging device 225. In some embodiments, the imaging device 225 includes application that has a graphical user interface (GUI) that guides the user 405 to capture the plurality of images of the user's 405 head from specific angles and/or distances relative to the user 405. For example, the GUI may request a front-facing image of the user's 405 face, an image of the user's 405 right ear, and an image of the user's 405 left ear. The imaging device 225 can also determine whether images are suitable for use by the equalization system 230 (e.g., based on image quality, features captured in the image).

Figure 4B:
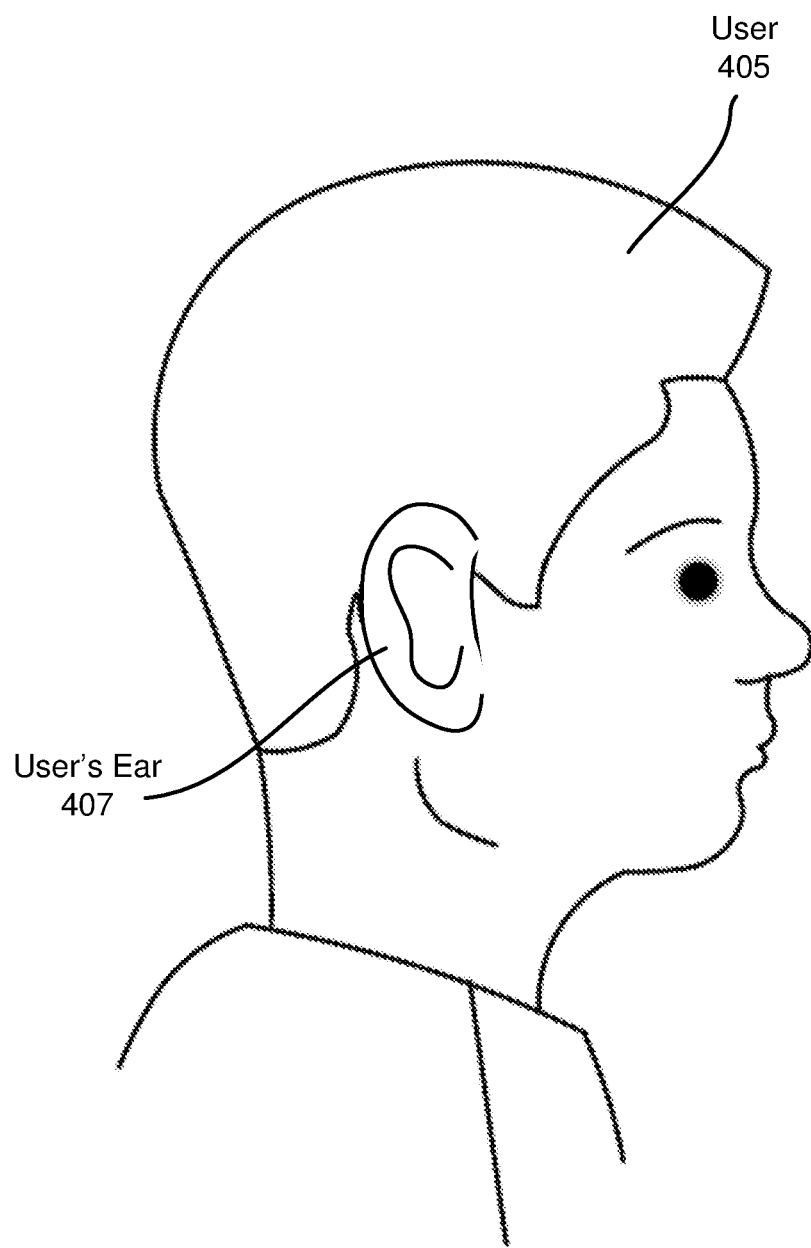
FIG. 4B is an image of a portion of user's head captured by the imaging device in FIG. 4A, in accordance with one or more embodiments.

FIG. 4B illustrates a side view of an image of the user 405 captured by the imaging device 225 in FIG. 4A, in accordance with one or more embodiments. The focus of the captured image is the user's ear 407. In some embodiments, the equalization system 230 can use the image shown in FIG. 4B to determine features associated with the user's ear 407 and/or the user's head. The imaging device 225 can capture additional images to determine additional features associated with the user's head.

While FIG. 4A illustrates the imaging device 225 capturing images of the head of the user 405, the imaging device 225 can also capture images of user wearing a headset (e.g., headset 100, headset 105).

Figure 5A:
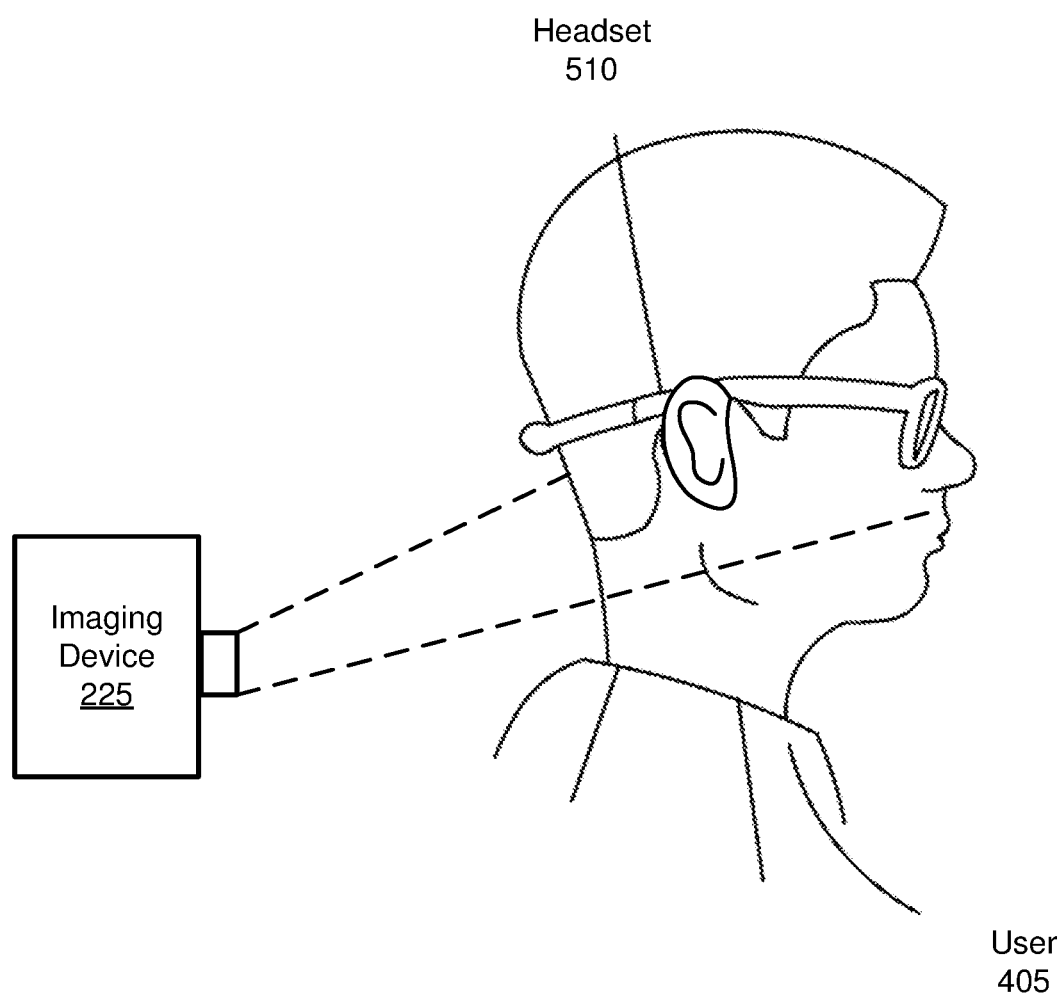
FIG. 5A is an example view of the imaging device capturing images of a head of a user wearing a headset, in accordance with one or more embodiments.

FIG. 5A is an example view of the imaging device 225 capturing images of a user 405 wearing a headset 510, in accordance with one or more embodiments. The headset 510 may be an embodiment of the headset 210, some near-eye display that includes an audio output (e.g., a speaker), or some other head-mounted display that includes an audio output.

Figure 5B:
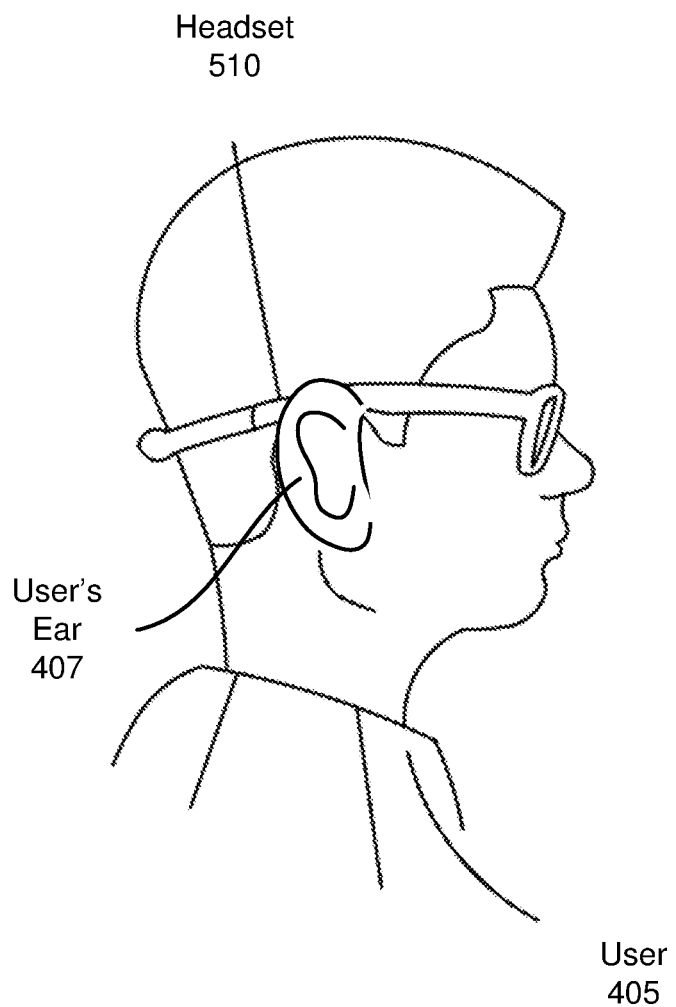
FIG. 5B is an image of a portion of the user's head captured by the imaging device in FIG. 5A, in accordance with one or more embodiments.

FIG. 5B illustrates a side view of an image of the user 405 wearing the headset 510 captured by the imaging device 225 in FIG. 5A, in accordance with one or more embodiments. The equalization system 230 can determine features associated with the user's ear 407 relative to the position of the headset 510, described in greater detail below. In one embodiment, the headset 510 includes one or more transducers, and at least one of the one or more transducers are captured in the image shown in FIG. 5A. As such, the equalization system 230 can determine distances between the user's ear 407 and the one or more transducers.

Vision models benefit from scale and orientation information to operate. There are certain scenarios where scale or orientation information can be encoded, however, these scenarios are usually non-trivial. Thus, in another embodiment, a headset (e.g., headset 210) includes one or more visual markers for determining a position of the headset relative to a user's ear when the user is wearing the headset. As described above and elsewhere herein, a machine learning based prediction engine uses images and videos of human head and ears to predict personalized acoustic transfer functions from headsets measured at a user's ears.

Accordingly, accurate information of the size and orientation of the visually captured anthropometric features is a key requirement for the images and videos to be useful for the model. Various methods can be devised to provide this information, such as including a reference visual object with known dimensions (e.g. coins) or markers (e.g. multiple dots) drawn on the features of interest such as ears and glasses frame with their relative distance measured with a ruler in the captured images and videos. However, these methods are cumbersome and/or unreliable to be appropriate for a product application.

One way to disambiguate the size and orientation of anthropometric features is to use markers designed into the headset for the explicit purpose of providing visual reference in the data. Thus, in one embodiment, the images and/or video is taken while the users are wearing the headsets as they normally fit on them. As the dimensions of these markers are known by design and their orientation relative to the head and ears is expected to be consistent on each user, markers can achieve the desired properties for a reliable visual reference inside the images. Also, a unique marker design associated with each headset model of unique dimensions can be used to identify the product model in the image from which the exact information of its industrial design can be inferred.

Figure 6A:
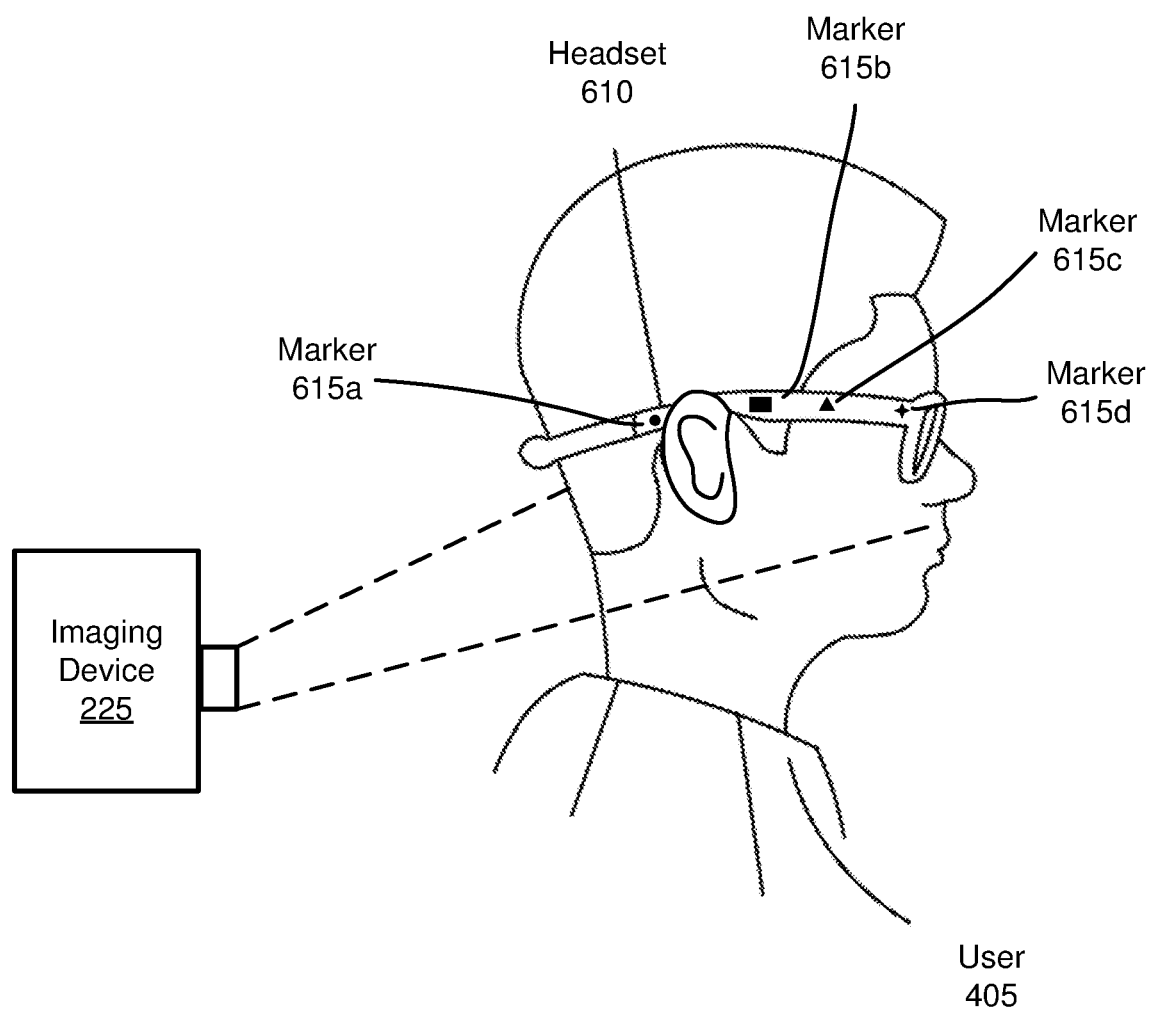
FIG. 6A is an example view of the imaging device capturing images of a head of a user wearing a headset with visual markers, in accordance with one or more embodiments.

FIG. 6A is an example view of the imaging device 225 capturing images of the user 405 wearing a headset 610 including a plurality of markers 615, in accordance with one or more embodiments. The headset 610 may be an embodiment of the headset 210, some near-eye display that includes an audio output (e.g., a speaker), or some head-mounted display that includes an audio output.

Figure 6B:
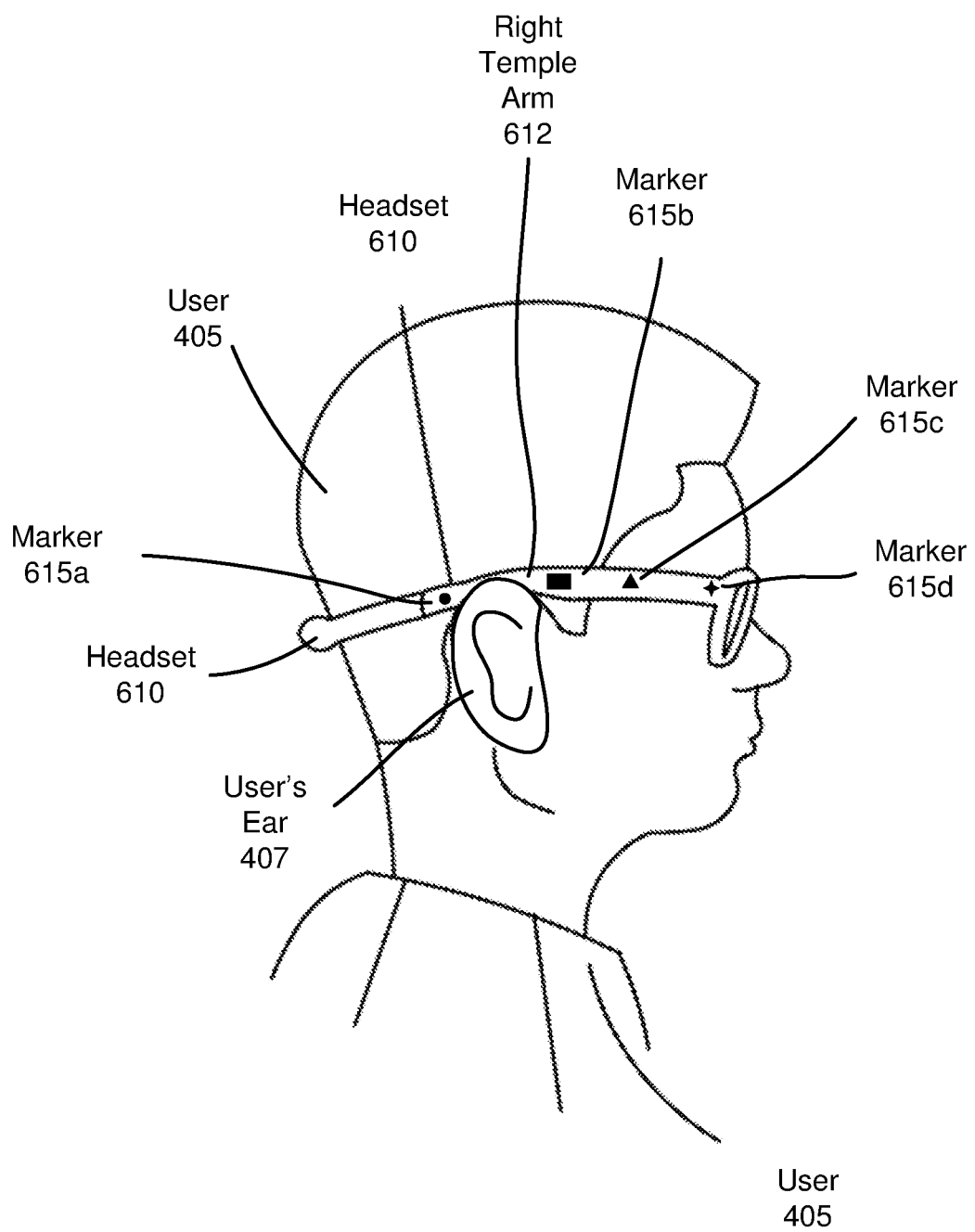
FIG. 6B is an image of a portion of the user's head captured by the imaging device in FIG. 6A, in accordance with one or more embodiments.

FIG. 6B illustrates an image of a portion of a user's head captured by the imaging device 225 in FIG. 6A, in accordance with one or more embodiments. The headset 610 captured in the image includes four markers 615a, 615b, 615c, and 615d along its right temple arm 612. The headset 610 may be symmetric such that the headset 610 includes identical markers in a corresponding position on the left temple arm (not shown). In other embodiments, the headset 610 may include any other suitable number of markers (e.g., one, three, ten) along the right temple arm, the left temple arm, and/or the front part of the frame. In the embodiment of FIG. 6B, the markers 615 each have a unique shape and size such that each marker 615 can be easily identified by the equalization system 230. Alternatively, the markers 615 can be substantially the same size and/or shape. Additionally, the dimensions of the headset 610 and the positions of the markers 615 relative to the headset 610 are known. The equalization system 230 can use the image shown in FIG. 6B to determine information related to the user's ear 407 relative to the headset 610. For example, the equalization system 230 can determine a distance between each marker and a point on the user's ear 407.

The imaging system 220 can capture and provide the one or more images, such as those shown in FIGS. 4B, 5B and 6B, to the equalization system 230 to generate an equalization filter for the user 405. The equalization system 230 can also receive additional images from the imaging device 225 of other views of the user's ear and/or head. The equalization system 230 can determine an audio output at the ear of the user based on the images. Furthermore, the images may be used to train one or more components of the equalization system 230, described in greater detail below.

Determining an Equalization Filter Based on a Simulation

A high-fidelity audio experience from a headset requires its audio output to match a consistent target response at the user's ears in terms of its spectral content and acoustic time delay. For an output module built-in to the device frame, a static, non-personalized EQ tuned on a manikin and/or ear couplers is insufficient to deliver this high-fidelity audio output, as the audio heard by each user is affected by multiple sources of variation such as their anthropometric features (e.g. pinna size and shape), inconsistency of fitment, transducer component sensitivity to environmental factors, manufacturing tolerance, etc. Of these, the person-to-person and fit-to-fit variations account for the largest portion of the audio output variability and are determined by the shape of the user's head and/or ears, and the relative position between the audio output module on the headset and the user's ears.

For headset with open-ear audio output consisting of a frame with speaker modules embedded on the temple arms, industrial design practices can be employed such that the fitting condition on the user is repeatable and stable throughout a normal usage of the device, thereby minimizing the fit-to-fit variation of the audio output. However, removing the person-to-person variation requires the knowledge of the audio output at the user's ears, which can be used to compensate for the variation by applying an individualized inverse equalization filter, as described herein. One way to obtain this knowledge is to place a microphone at the entrance to the ear canal location to measure the raw response of the audio output. Practical application of this approach leads to challenges in the industrial design in terms of comfort and aesthetics and also in the user experience in terms of ease of use. Therefore, an alternative method to measure or predict the audio output at the wearer's ears is desired.

In one embodiment, a method to achieve such a goal includes building a machine learning model able to reconstruct the 3-D geometry of human head and/or ears wearing headset based on videos and images, trained with a data set consisting of images and videos of human subjects wearing the headsets and high-quality 3-D-scanned mesh of the corresponding users' head and ears. The reconstructed 3-D geometry is then used as input to a numerical simulation engine for acoustic propagation of the headset output to the ear, predicting the audio output observed at the user's ears. This predicted response can be used to generate a device-specific personalized equalization filter for the user's audio.

Figure 7:
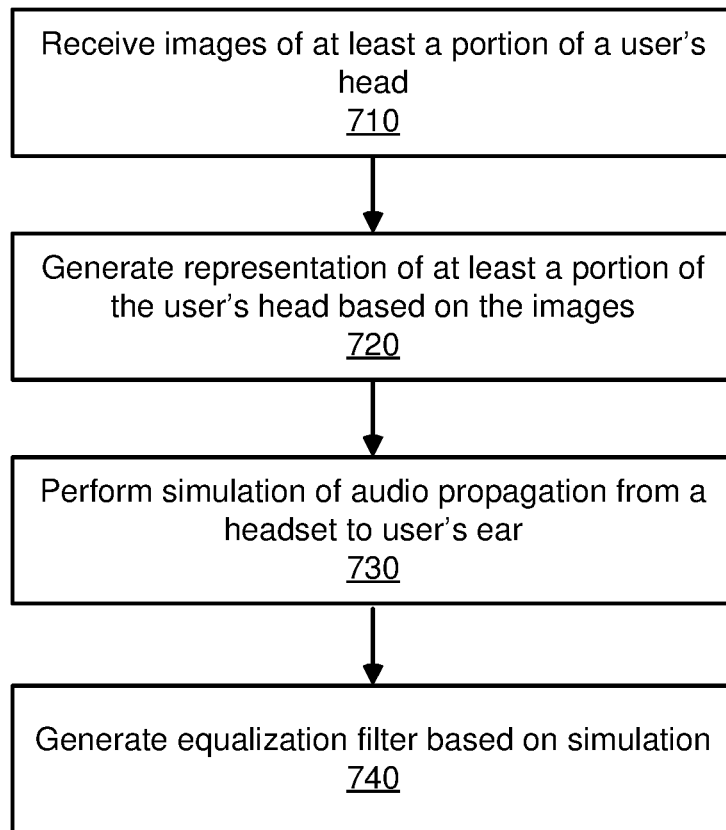
FIG. 7 illustrates a method of generating an individualized equalization filter for a user based on a simulation, in accordance with one or more embodiments.

FIG. 7 illustrates an example method of generating an equalization filter for a user based on a representation of the user's ear, in accordance with an embodiment. The steps can be performed by one or more components of the system 200 shown in FIG. 2 (e.g., equalization system 230). In other embodiments, the steps may be performed in a different order than described herein.

The equalization system 230 receives 710 one or more images of at least a portion of a user's head. In one embodiment, the equalization system 230 receives one or more images of the user's ear, the user's head, and/or the user wearing a headset 210. For example, the equalization system 230 receives the image shown in FIG. 4B. The images may be captured using an imaging device 225 associated with a user device (e.g., a cellphone).

The equalization system 230 generates 720 a representation of at least a portion of the user's head based on the one or more images. In some embodiments, the equalization system 230 generates a representation of one or both of the user's ears. Alternatively, the equalization system 230 can generate a representation the user's head including one or both of the user's ears. The generated representation may be a 3D mesh representing an ear and/or head of the user or a PCA-based representation, described in greater detail below in relation to FIGS. 8A-8B.

The equalization system 230 performs 730 a simulation of audio propagation from an audio system included in a headset to the user's ear based on the representation of the user's ear. The audio system may be an array of transducers coupled to a left and/or right temple arm of the headset 210. The equalization system 230 determines a predicted audio output response based on the simulation. For example, the equalization system 230 can determine one or more acoustic parameters perceived by the user (e.g., pitch, frequency, volume, balance, etc.) based on the simulation.

The equalization system 230 generates 740 an equalization filter based on the predicted audio output response. As such, the user can experience a custom audio environment provided by a headset 210. For example, the predicted audio output response may have a higher than average frequency due to the user's anthropometric features, and the equalization system 230 generates an equalization filter that reduces the frequency of audio content provided to the user. In some embodiments, the equalization system 230 provides the equalization filter to the headset 210 such that the headset 210 can use the equalization filter to adjust audio content provided to the user. Additionally, the equalization system 230 can provide the equalization filter to the online system 240, and the online system 240 can store the equalization filter to a profile of the user associated with the online system 240 (e.g., a social networking profile).

In some embodiments, the representation of the user's ear described above is generated using a trained model (e.g., PCA model). Employing machine learning techniques allows the reconstruction module 320 to generate a more accurate representation of a user's ear and/or head. FIG. 8A is a block diagram of a training a PCA-model 860, in accordance with one or more embodiments. The machine learning process can be used to generate a PCA-based representation of a user's ear and determine an audio output response for a user.

The reconstruction module 320 receives information (e.g., features from the image(s) of the user's head) from the feature extraction module 310 and/or the depth map generator 315. Based on the information, the reconstruction module 320 generates a PCA-based representation of the user's head using the PCA-model 860. In one embodiment, the PCA-based representation also includes a representation of a headset. As such, the reconstruction module 320 can use a PCA model 860 trained to produce a PCA-based representation in which a human head or shapes of the human head (e.g. ear shapes) wearing a headset is represented as a linear combination of three-dimensional shapes of representative test subjects' heads or head feature wearing the headset. In other embodiments, the PCA model 860 is trained to produce a PCA-based representation of a headset (e.g., the headset 210) that is represented as a linear combination of three-dimensional shapes of representative images of the headset. The PCA model 860 may be also trained to produce a PCA-based representation in which a human head or shapes of a human head feature (e.g. ear shapes) are represented as a linear combination of three-dimensional shapes of representative test subjects' heads or head feature. In other embodiments, the PCA model 860 may combine the PCA-based representation of the head with the PCA based representation of the headset to obtain a PCA-based representation of the head wearing the headset. Alternatively, the PCA model 860 can be trained to produce PCA-based representation in which a human head or shapes of the human head feature (e.g. ear shapes) wearing a headset (e.g., the headset 210) are represented as a linear combination of three-dimensional shapes of representative test subjects' heads or head feature's while wearing the headset.

Taking an example of using PCA analysis on the shape of ears of a head wearing the headset, a three-dimensional shape of a random ear shape E can be represented as follows:

$$E = \Sigma(\alpha_i \times \varepsilon_i) \quad (1)$$

where $\alpha_i$ represents i-th principal component (i.e., three dimensional i-th representative ear shape) and $\varepsilon_i$ represents PCA coefficient of the ith principal component. The number of principal components (the number of "i") is selected so that it is smaller than the total number of test subjects provided with their measured audio output responses. In an example, the number of principal components is 5 to 10.

In some embodiments, the PCA-based representation is generated using representations of test subjects' head shapes wearing the headset and their measured audio output responses, so that the use of PCA-based representation obtained from the PCA model 860 may yield more accurate equalization filter by simulation compared to performing simulation on a three-dimensional mesh geometry of the same user head wearing the headset. The test subjects described herein refer to humans or physical models of humans for which their head shape geometries (or head shape images) and audio output responses are already known (i.e. "measured audio output responses"). To obtain the audio output responses, the test subjects may be placed in an anechoic chamber and exposed to sounds from one or more transducers with microphones placed at the test subjects' ears. In some embodiments, audio output responses are measured for a test headset (including a test transducer array) that is worn by the test subjects. The test headset is substantially the same as the headset worn by the user.

Figure 8A:
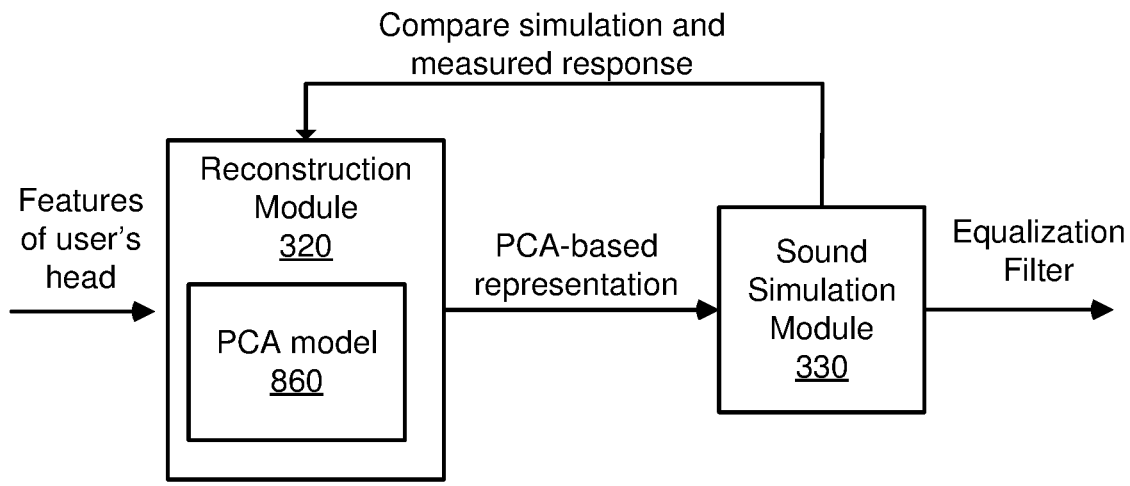
FIG. 8A illustrates an example flow of generating a representation of a user's ear using a machine learning model, in accordance with one or more embodiments.

As shown in FIG. 8A, the PCA model 860 provides the PCA-based representation to the sound simulation module 330, and the sound simulation module 330 performs a simulated audio output response using the PCA-based representation. The equalization system 230 can compare measured audio output responses and simulated audio output responses of the test subjects to update the PCA model 860, described in greater detail below in relation to FIG. 8B. After the PCA model is determined and/or updated, the PCA model 860 is trained using the images of the test subjects' head wearing the headset and their PCA-based representations according to the PCA model 860. The trained PCA model 860 can predict or infer the PCA-based representations of a user's head wearing the headset from the images of the user's head wearing the headset. In some embodiments, the trained PCA model 860 can predict or infer the PCA-based representation of a user's head wearing the headset from the images of the user's head and other images of the headset.

In some embodiments, generation of the PCA model 860 and the training of the PCA model 860 can be performed offline. Then, the trained PCA model 860 can be deployed in the reconstruction module 320 of the equalization system 230. Using the trained PCA model 860 enables the reconstruction module 320 to produce a PCA-based representation of a user in a robust and efficient manner.

Figure 8B:
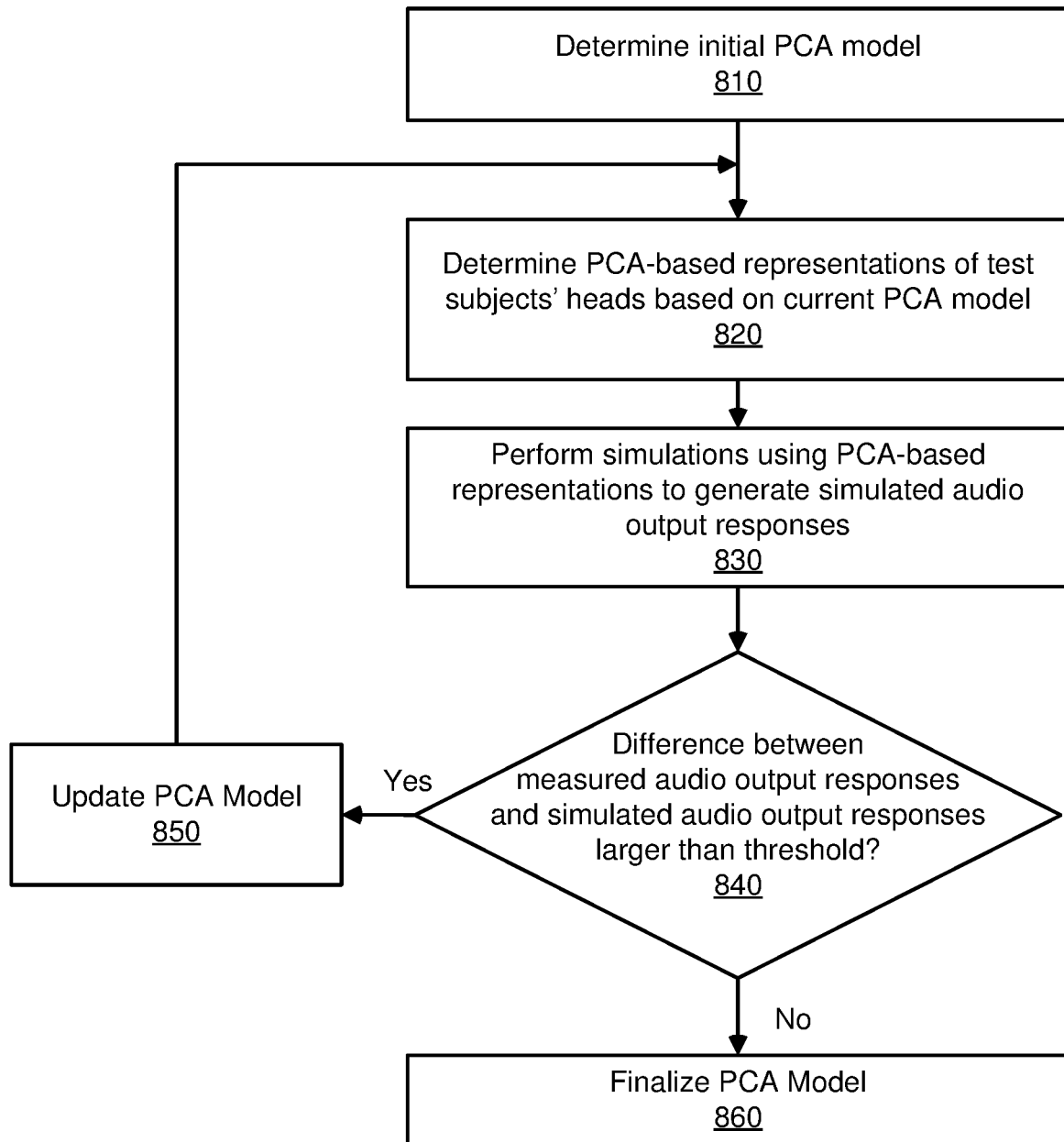
FIG. 8B is a flow diagram of determining a PCA model, in accordance with one or more embodiments.

FIG. 8B is a flow diagram of generating and updating a PCA model 860, in accordance with one or more embodiments. In one embodiment, the process of FIG. 8B is performed by components of the equalization system 230. Other entities may perform some or all of the steps of the process in other embodiments. Likewise, embodiments may include different and/or additional steps, or perform the steps in different orders.

The equalization system 230 determines 810 an initial PCA model. In some embodiments, the equalization system 230 determines the initial PCA model by selecting a subset of the test subjects' head (or a portion thereof) as principal components for representing a random head shape or a feature of the head shape.

The equalization system 230 determines 820 PCA-based representations of test images using the current PCA model. For example, the initial PCA model processes the images of the test subjects' heads wearing a test headset that includes a test transducer array to determine PCA-based representations of the test subjects' heads or portions of the test subjects' heads (e.g., ears) while wearing the test headset. That is, all test subjects' head shapes (or shapes of portions of the heads) wearing the headset are represented as a linear combination of a subset of test subjects' head shapes multiplied by a corresponding PCA coefficient, as explained above with reference to Equation (1). Note that the test headset is substantially the same as the headset worn by the user.

The equalization system 230 performs 830 one or more simulations using the PCA-based representation to generate simulated audio output responses. The one or more simulations are performed on the PCA-based representations using one or more of BEM, FEM, FDTD method, or PSTD method as described above with reference to FIG. 3. As the result of the simulation, the equalization system 230 obtains simulated audio output response of the test subjects based on the current PCA-model.

The equalization system 230 determines 840 whether the difference between the measured audio output response and the simulated audio output response of the test subjects is larger than a threshold. The difference may be a sum of the magnitude of the differences between the measured audio output response and the simulated audio output response for each of the test subjects.

If the difference is larger than the threshold, the equalization system 230 updates 850 the PCA model to a new current PCA model. The updating of the PCA model may include adding or reducing the number of principal components, updating PCA coefficient values or updating the representative shapes. Then, the process returns to determining 820 new sets of PCA-based representations based on the updated current PCA model and repeats the subsequent steps.

If the equalization system 230 determines 840 that the difference is less than or equal to the threshold, the current PCA model is finalized 860 as the PCA model for deployment (i.e. for use by the equalization system 230 described above in relation to FIG. 7).

Determining Audio Output Response Using Trained Model

In another embodiment, the equalization system 230 determines an audio output response using a machine learning model. The machine learning model can be trained with a data set consisting of images and videos of human subjects wearing the headset and the audio output response measured at the ears of the corresponding subjects, which will be able to predict the audio output response to a new user based on the images and videos of their head and ear geometry. Accordingly, in this embodiment, the machine learning model computes an equalization filter directly from the anthropometric features visually extracted from the images and videos.

Figure 9A:
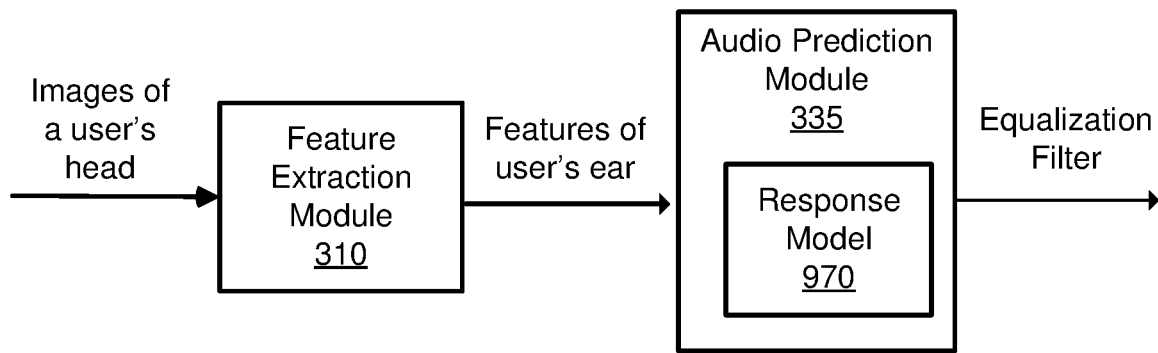
FIG. 9A illustrates a machine learning model for predicting an audio output at the ear of a user, in accordance with one or more embodiments.

FIG. 9A illustrates a machine learning process for predicting an audio output response, in accordance with an embodiment. The feature extraction module 310 receives images of the user's head including at least the user's ear. The feature extraction module 310 extracts features describing the user's ear and provides the extracted features to the audio prediction module 335. The audio prediction module 335 predicts an audio output response based on the features of the user's ear using a response model 970 (i.e., a machine learning model). The response model 970 is generated and trained using images of additional users, their associated features and measured audio response profiles. In some embodiments, the response model 970 may be updated by comparing predicted audio output responses of additional users with the measured audio output responses of the additional users. The additional users described herein refer to humans or physical models of humans for which their anthropometric features and audio output responses are already known. The anthropometric features may be determined by a human or another model. To obtain the audio output responses, the additional users may be placed in an anechoic chamber and exposed to sounds from one or more transducers with microphones placed at the additional users' ears. In some embodiments, audio output responses are measured for a test headset (including a test transducer array) that is worn by the additional users. The test headset is substantially the same as the headset worn by the user. The trained response model 970 can be used to predict an audio output response, described in greater detail below in relation to FIG. 9B.

Figure 9B:
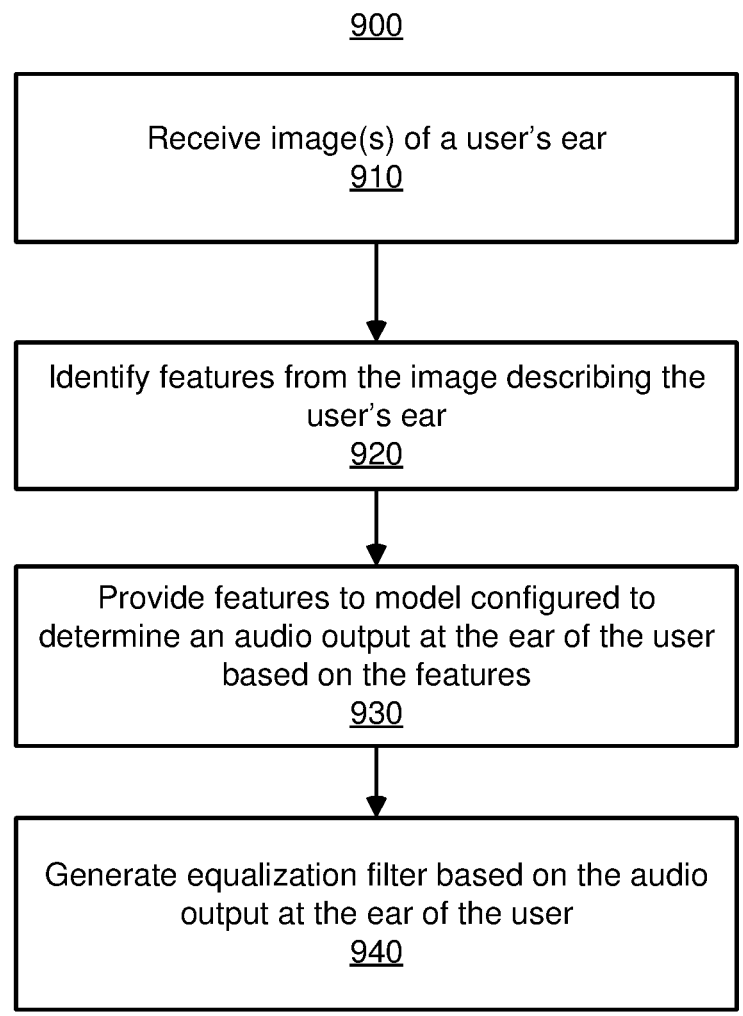
FIG. 9B illustrates a method of generating an individualized equalization filter using a machine learning model, in accordance with one or more embodiments.

FIG. 9B illustrates a method of generating an equalization filter based on the audio output at the user's ears determined using the response model 970, in accordance with one embodiment. The steps can be performed by one or more components of the system environment 200 shown in FIG. 2 (e.g., equalization system 230). In one embodiment, the process is performed using the machine learning response model 970 described above in relation to FIG. 9A. The method 900 can include fewer or greater steps than described herein.

The equalization system 230 receives 910 one or more images of a user's ear and/or head. In one embodiment, the equalization system 230 receives one or more images of a user's ear, a user's head, and/or a user wearing a headset 210 (e.g., images shown in FIGS. 4B, 5B and 6B). The images may be captured using an imaging device 225 (e.g., a cellphone).

The equalization system 230 identifies 920 one or more features from the image describing the user's ear. The features may describe anthropometric information related to the user's ear and/or head (e.g., dimensions, positions, shapes). The features may be based on extracted information from the images (e.g., depth information, color information). In some embodiments, the features may be identified relative to a headset. For example, in the embodiment of FIG. 6B, the equalization system extracts information related to a position of the headset 510 relative to the user's ear 407 based on the markers 615 to determine features of the ear.

The equalization system 230 provides 930 the features as input to a model (e.g., response model 970). The model is configured to determine an audio output response based on the features. The model is trained using images of additional users' ears and the features extracted from the images, where the audio output response of each additional user is known. The equalization system 230 can periodically retrain the model and use the trained model to predict an audio output response for the user.

The equalization system 230 generates 940 an equalization filter based on the predicted audio output at the ear of the user. The equalization filter is configured to adjust one or more acoustic parameters of audio content provided to the user by a headset. The equalization system 230 can provide the equalization filter to a headset (e.g., headset 610) such that the headset can use the equalization filter to provide audio content to the user. Additionally, the equalization system 230 can provide the equalization filter to an online system 240 for associating the equalization filter with an online profile of the user.

The trained response model 970 allows the equalization system 230 to quickly and efficiently predict an audio output at the ear of a user based on images of the user. As such, the equalization system 230 can generate an equalization filter configured to customize audio content for a user, enhancing the user's audio experience. In some embodiments, the response model 970 can be used for multiple users and multiple devices. Alternatively, a response model 970 may be customized to a particular device for adjusting the audio output for a specific user-device combination. For example, the equalization filter generator 345 can generate a model for headset device 100 and another model for headset device 105 that is generated based on images of the user wearing the respective device and the user's measured audio output at their ears for that device. The equalization system 230 can thus generate an individualized equalization filter specific to each device of a user.

In some embodiments, aspects of the processes illustrated in FIGS. 7 and 8A-8B can be combined with aspects of the processes illustrated in FIGS. 9A-9B to enhance user audio experience. For example, in the embodiment of FIG. 9B, the equalization system 230 can additionally generate a 3-D representation of the user's ear, as described in relation to FIG. 7, and the 3-D representation can be input to a model to generate a predict an audio output response, without performing a simulation. The equalization system 230 can additionally generate an equalization filter based on a combination of models and/or processes. The equalization system 230 can provide the equalization system 230 to an audio system 215 of a headset 210, described in greater detail below.

Audio System

Figure 10:
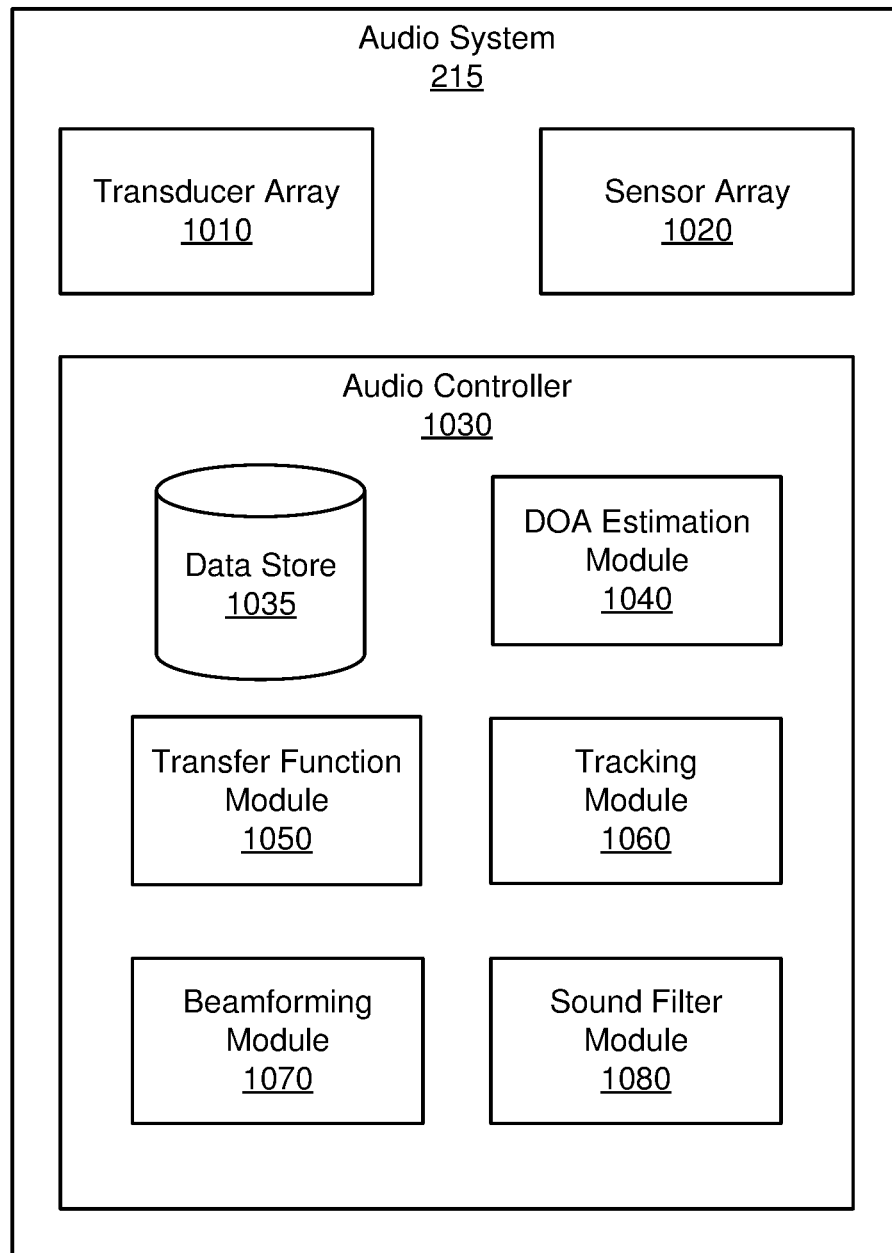
FIG. 10 is a block diagram of an audio system, in accordance with one or more embodiments.

FIG. 10 is a block diagram of an audio system 215, in accordance with one or more embodiments. The audio system in FIG. 1A or FIG. 1B may be an embodiment of the audio system 215. In some embodiments, the audio system 215 employs an individualized audio output response generated by the equalization system 230 to generate and/or modify audio content for the user. In the embodiment of FIG. 2, the audio system 215 includes a transducer array 1010, a sensor array 1020, and an audio controller 1030. Some embodiments of the audio system 215 have different components than those described here. Similarly, in some cases, functions can be distributed among the components in a different manner than is described here.

The transducer array 1010 is configured to present audio content. The transducer array 1010 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 1010 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 1010 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 1030, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 1010 generates audio content in accordance with instructions from the audio controller 1030. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 215. The transducer array 1010 may be coupled to a wearable device (e.g., the headset 100 or the headset 105). In alternate embodiments, the transducer array 1010 may be a plurality of speakers that are separate from the wearable device (e.g., coupled to an external console).

In one embodiment, the transducer array 1010 uses one or more individualized audio output responses generated by the equalization system 230 to provide audio content to the user. Each of the transducers in the transducer array 1010 can use the same individualized audio output response, or each transducer may correspond to a unique individualized audio output response. One or more individualized audio output responses may be received from the equalization system 230 and/or the sound filter module 1080.

The sensor array 1020 detects sounds within a local area surrounding the sensor array 1020. The sensor array 1020 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 1020 is configured to monitor the audio content generated by the transducer array 1010 using at least some of the plurality of acoustic sensors. Increasing the number of sensors may improve the accuracy of information (e.g., directionality) describing a sound field produced by the transducer array 1010 and/or sound from the local area.

The audio controller 1030 controls operation of the audio system 215. In the embodiment of FIG. 10, the audio controller 1030 includes a data store 1035, a DOA estimation module 1040, a transfer function module 1050, a tracking module 1060, a beamforming module 1070, and a sound filter module 1080. The audio controller 1030 may be located inside a headset, in some embodiments. Some embodiments of the audio controller 1030 have different components than those described here. Similarly, functions can be distributed among the components in different manners than described here. For example, some functions of the controller may be performed external to the headset.

The data store 1035 stores the equalization filters and other data for use by the audio system 215. Data in the data store 1035 may include sounds recorded in the local area of the audio system 215, audio content, head-related transfer functions (HRTFs), transfer functions for one or more sensors, array transfer functions (ATFs) for one or more of the acoustic sensors, individualized audio output responses, audio profiles, sound source locations, virtual model of local area, direction of arrival estimates, sound filters, and other data relevant for use by the audio system 215, or any combination thereof.

The DOA estimation module 1040 is configured to localize sound sources in the local area based in part on information from the sensor array 1020. Localization is a process of determining where sound sources are located relative to the user of the audio system 215. The DOA estimation module 1040 performs a DOA analysis to localize one or more sound sources within the local area. The DOA analysis may include analyzing the intensity, spectra, and/or arrival time of each sound at the sensor array 1020 to determine the direction from which the sounds originated. In some cases, the DOA analysis may include any suitable algorithm for analyzing a surrounding acoustic environment in which the audio system 215 is located.

For example, the DOA analysis may be designed to receive input signals from the sensor array 1020 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 1020 received the direct-path audio signal. The determined angle may then be used to identify the DOA for the received input signal. Other algorithms not listed above may also be used alone or in combination with the above algorithms to determine DOA.

In some embodiments, the DOA estimation module 1040 may also determine the DOA with respect to an absolute position of the audio system 215 within the local area. The position of the sensor array 1020 may be received from an external system (e.g., some other component of a headset, an artificial reality console, a mapping server, a position sensor (e.g., the position sensor 190), etc.). The external system may create a virtual model of the local area, in which the local area and the position of the audio system 215 are mapped. The received position information may include a location and/or an orientation of some or all of the audio system 215 (e.g., of the sensor array 1020). The DOA estimation module 1040 may update the estimated DOA based on the received position information.

The transfer function module 1050 is configured to generate one or more acoustic transfer functions. Generally, a transfer function is a mathematical function giving a corresponding output value for each possible input value. Based on parameters of the detected sounds, the transfer function module 1050 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound sounds and the corresponding sound received by the acoustic sensors in the sensor array 1020. Accordingly, for a sound source there is a corresponding transfer function for each of the acoustic sensors in the sensor array 1020. And collectively the set of transfer functions is referred to as an ATF. Accordingly, for each sound source there is a corresponding ATF. Note that the sound source may be, e.g., someone or something generating sound in the local area, the user, or one or more transducers of the transducer array 1010. The ATF for a particular sound source location relative to the sensor array 1020 may differ from user to user due to a person's anatomy (e.g., ear shape, shoulders, etc.) that affects the sound as it travels to the person's ears. Accordingly, the ATFs of the sensor array 1020 are personalized for each user of the audio system 215.

In some embodiments, the transfer function module 1050 determines one or more HRTFs for a user of the audio system 215. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 1050 may determine HRTFs for the user using a calibration process. In some embodiments, the transfer function module 1050 may provide information about the user to a remote system. The remote system determines a set of HRTFs that are customized to the user using, e.g., machine learning, and provides the customized set of HRTFs to the audio system 215.

The tracking module 1060 is configured to track locations of one or more sound sources. The tracking module 1060 may compare current DOA estimates and compare them with a stored history of previous DOA estimates. In some embodiments, the audio system 215 may recalculate DOA estimates on a periodic schedule, such as once per second, or once per millisecond. The tracking module may compare the current DOA estimates with previous DOA estimates, and in response to a change in a DOA estimate for a sound source, the tracking module 1060 may determine that the sound source moved. In some embodiments, the tracking module 1060 may detect a change in location based on visual information received from the headset or some other external source. The tracking module 1060 may track the movement of one or more sound sources over time. The tracking module 1060 may store values for a number of sound sources and a location of each sound source at each point in time. In response to a change in a value of the number or locations of the sound sources, the tracking module 1060 may determine that a sound source moved. The tracking module 1060 may calculate an estimate of the localization variance. The localization variance may be used as a confidence level for each determination of a change in movement.

The beamforming module 1070 is configured to process one or more ATFs to selectively emphasize sounds from sound sources within a certain area while de-emphasizing sounds from other areas. In analyzing sounds detected by the sensor array 1020, the beamforming module 1070 may combine information from different acoustic sensors to emphasize sound associated from a particular region of the local area while deemphasizing sound that is from outside of the region. The beamforming module 1070 may isolate an audio signal associated with sound from a particular sound source from other sound sources in the local area based on, e.g., different DOA estimates from the DOA estimation module 1040 and the tracking module 1060. The beamforming module 1070 may thus selectively analyze discrete sound sources in the local area. In some embodiments, the beamforming module 1070 may enhance a signal from a sound source. For example, the beamforming module 1070 may apply sound filters which eliminate signals above, below, or between certain frequencies. Signal enhancement acts to enhance sounds associated with a given identified sound source relative to other sounds detected by the sensor array 1020.

The sound filter module 1080 determines sound filters, such as the equalization filter, for the transducer array 1010. In some embodiments, the sound filters cause the audio content to be spatialized, such that the audio content appears to originate from a target region. The sound filter module 1080 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 1080 calculates one or more of the acoustic parameters. In some embodiments, the sound filter module 1080 requests the acoustic parameters from a mapping server (e.g., as described below with regard to FIG. 11). In some embodiment, the sound filter module 1080 receives one or more equalization filters, an individualized equalization filter from the equalization system 230. The sound filter module 1080 provides the sound filters (e.g., an individualized equalization filter) to the transducer array 1010. In some embodiments, the sound filters may cause positive or negative amplification of sounds as a function of frequency.

Figure 11:
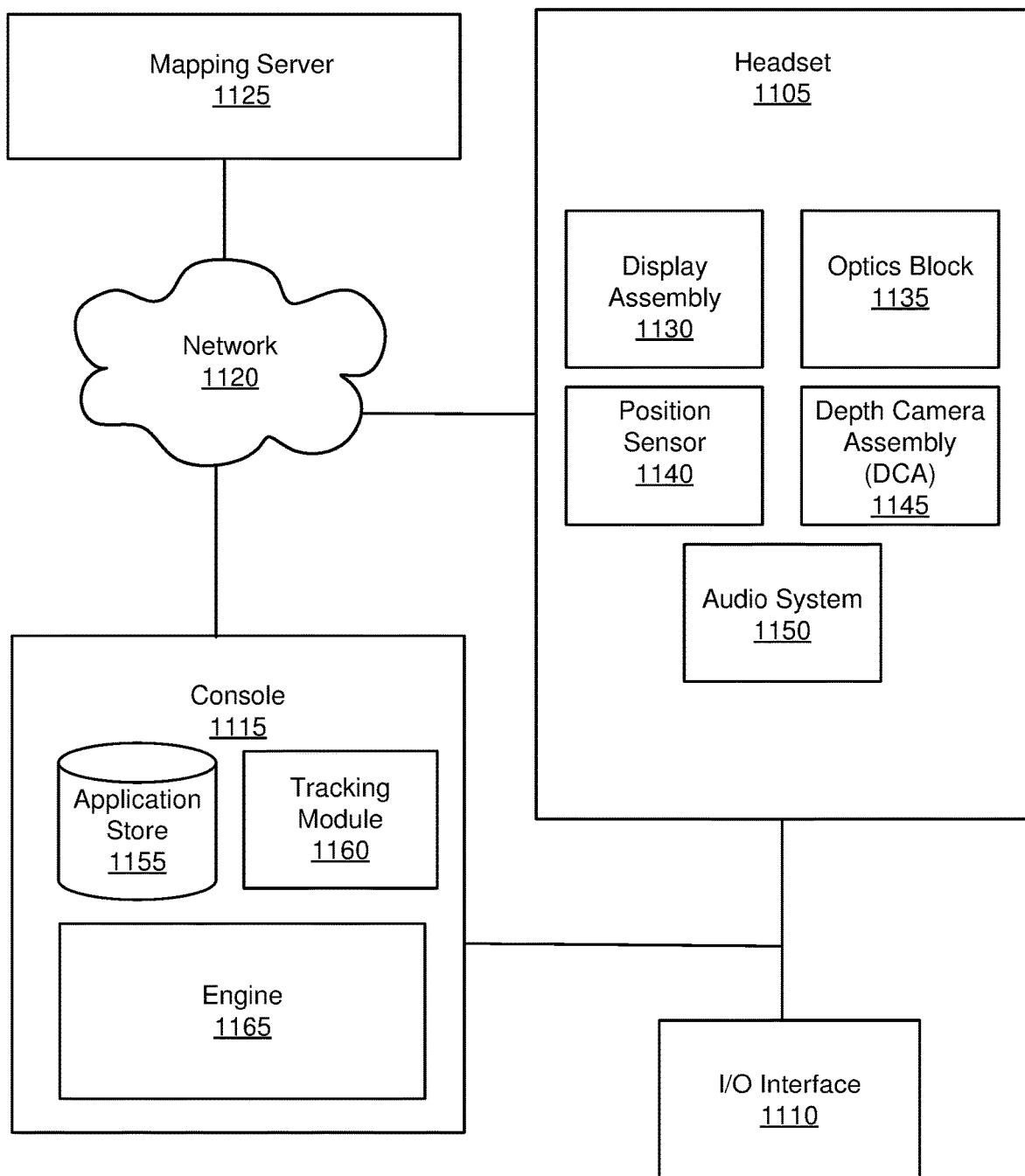
FIG. 11 is a system environment for providing audio content to a user, in accordance with an embodiment.

FIG. 11 is a system 1100 that includes a headset 1105, in accordance with one or more embodiments. In some embodiments, the headset 1105 may be the headset 100 of FIG. 1A or the headset 105 of FIG. 1B. The system 1100 may operate in an artificial reality environment (e.g., a virtual reality environment, an augmented reality environment, a mixed reality environment, or some combination thereof). The system 1100 shown by FIG. 11 includes the headset 1105, an input/output (I/O) interface 1110 that is coupled to a console 1115, the network 1120, and the mapping server 1125. While FIG. 11 shows an example system 1100 including one headset 1105 and one I/O interface 1110, in other embodiments any number of these components may be included in the system 1100. For example, there may be multiple headsets each having an associated I/O interface 1110, with each headset and I/O interface 1110 communicating with the console 1115. In alternative configurations, different and/or additional components may be included in the system 1100. Additionally, functionality described in conjunction with one or more of the components shown in FIG. 11 may be distributed among the components in a different manner than described in conjunction with FIG. 11 in some embodiments. For example, some or all of the functionality of the console 1115 may be provided by the headset 1105.

The headset 1105 includes the display assembly 1130, an optics block 1135, one or more position sensors 1140, and the DCA 1145. Some embodiments of headset 1105 have different components than those described in conjunction with FIG. 11. Additionally, the functionality provided by various components described in conjunction with FIG. 11 may be differently distributed among the components of the headset 1105 in other embodiments, or be captured in separate assemblies remote from the headset 1105.

The display assembly 1130 displays content to the user in accordance with data received from the console 1115. The display assembly 1130 displays the content using one or more display elements (e.g., the display elements 120). A display element may be, e.g., an electronic display. In various embodiments, the display assembly 1130 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 1135.

The optics block 1135 may magnify image light received from the electronic display, corrects optical errors associated with the image light, and presents the corrected image light to one or both eyeboxes of the headset 1105. In various embodiments, the optics block 1135 includes one or more optical elements. Example optical elements included in the optics block 1135 include: an aperture, a Fresnel lens, a convex lens, a concave lens, a filter, a reflecting surface, or any other suitable optical element that affects image light. Moreover, the optics block 1135 may include combinations of different optical elements. In some embodiments, one or more of the optical elements in the optics block 1135 may have one or more coatings, such as partially reflective or anti-reflective coatings.

Magnification and focusing of the image light by the optics block 1135 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 1135 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 1135 corrects the distortion when it receives image light from the electronic display generated based on the content.

The position sensor 1140 is an electronic device that generates data indicating a position of the headset 1105. The position sensor 1140 generates one or more measurement signals in response to motion of the headset 1105. The position sensor 190 is an embodiment of the position sensor 1140. Examples of a position sensor 1140 include: one or more IMUs, one or more accelerometers, one or more gyroscopes, one or more magnetometers, another suitable type of sensor that detects motion, or some combination thereof. The position sensor 1140 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 1105 from the sampled data. For example, the IMU integrates the measurement signals received from the accelerometers over time to estimate a velocity vector and integrates the velocity vector over time to determine an estimated position of a reference point on the headset 1105. The reference point is a point that may be used to describe the position of the headset 1105. While the reference point may generally be defined as a point in space, however, in practice the reference point is defined as a point within the headset 1105.

The DCA 1145 generates depth information for a portion of the local area. The DCA includes one or more imaging devices and a DCA controller. The DCA 1145 may also include an illuminator. Operation and structure of the DCA 1145 is described above with regard to FIG. 1A.

The audio system 1150 provides audio content to a user of the headset 1105. The audio system 1150 is substantially the same as the audio system 215 describe above. The audio system 1150 may comprise one or acoustic sensors, one or more transducers, and an audio controller. In some embodiment, the audio system 1150 receives one or more equalization filters from the equalization system 230 and applies the equalization filters to the one or more transducers. The audio system 1150 may provide spatialized audio content to the user. In some embodiments, the audio system 1150 may request acoustic parameters from the mapping server 1125 over the network 1120. The acoustic parameters describe one or more acoustic properties (e.g., room impulse response, a reverberation time, a reverberation level, etc.) of the local area. The audio system 1150 may provide information describing at least a portion of the local area from e.g., the DCA 1145 and/or location information for the headset 1105 from the position sensor 1140. The audio system 1150 may generate one or more sound filters using one or more of the acoustic parameters received from the mapping server 1125, and use the sound filters to provide audio content to the user.

The I/O interface 1110 is a device that allows a user to send action requests and receive responses from the console 1115. An action request is a request to perform a particular action. For example, an action request may be an instruction to start or end capture of image or video data, or an instruction to perform a particular action within an application. The I/O interface 1110 may include one or more input devices. Example input devices include: a keyboard, a mouse, a game controller, or any other suitable device for receiving action requests and communicating the action requests to the console 1115. An action request received by the I/O interface 1110 is communicated to the console 1115, which performs an action corresponding to the action request. In some embodiments, the I/O interface 1110 includes an IMU that captures calibration data indicating an estimated position of the I/O interface 1110 relative to an initial position of the I/O interface 1110. In some embodiments, the I/O interface 1110 may provide haptic feedback to the user in accordance with instructions received from the console 1115. For example, haptic feedback is provided when an action request is received, or the console 1115 communicates instructions to the I/O interface 1110 causing the I/O interface 1110 to generate haptic feedback when the console 1115 performs an action.

The console 1115 provides content to the headset 1105 for processing in accordance with information received from one or more of: the DCA 1145, the headset 1105, and the I/O interface 1110. In the example shown in FIG. 11, the console 1115 includes an application store 1155, a tracking module 1160, and an engine 1165. Some embodiments of the console 1115 have different modules or components than those described in conjunction with FIG. 11. Similarly, the functions further described below may be distributed among components of the console 1115 in a different manner than described in conjunction with FIG. 11. In some embodiments, the functionality discussed herein with respect to the console 1115 may be implemented in the headset 1105, or a remote system.

The application store 1155 stores one or more applications for execution by the console 1115. An application is a group of instructions, that when executed by a processor, generates content for presentation to the user. Content generated by an application may be in response to inputs received from the user via movement of the headset 1105 or the I/O interface 1110. Examples of applications include: gaming applications, conferencing applications, video playback applications, or other suitable applications.

The tracking module 1160 tracks movements of the headset 1105 or of the I/O interface 1110 using information from the DCA 1145, the one or more position sensors 1140, or some combination thereof. For example, the tracking module 1160 determines a position of a reference point of the headset 1105 in a mapping of a local area based on information from the headset 1105. The tracking module 1160 may also determine positions of an object or virtual object. Additionally, in some embodiments, the tracking module 1160 may use portions of data indicating a position of the headset 1105 from the position sensor 1140 as well as representations of the local area from the DCA 1145 to predict a future location of the headset 1105. The tracking module 1160 provides the estimated or predicted future position of the headset 1105 or the I/O interface 1110 to the engine 1165.

The engine 1165 executes applications and receives position information, acceleration information, velocity information, predicted future positions, or some combination thereof, of the headset 1105 from the tracking module 1160.

Based on the received information, the engine 1165 determines content to provide to the headset 1105 for presentation to the user. For example, if the received information indicates that the user has looked to the left, the engine 1165 generates content for the headset 1105 that mirrors the user's movement in a virtual local area or in a local area augmenting the local area with additional content. Additionally, the engine 1165 performs an action within an application executing on the console 1115 in response to an action request received from the I/O interface 1110 and provides feedback to the user that the action was performed. The provided feedback may be visual or audible feedback via the headset 1105 or haptic feedback via the I/O interface 1110.

The network 1120 couples the headset 1105 and/or the console 1115 to the mapping server 1125. The network 1120 may include any combination of local area and/or wide area networks using both wireless and/or wired communication systems. For example, the network 1120 may include the Internet, as well as mobile telephone networks. In one embodiment, the network 1120 uses standard communications technologies and/or protocols. Hence, the network 1120 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 1120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 1120 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 1125 may include a database that stores a virtual model describing a plurality of spaces, wherein one location in the virtual model corresponds to a current configuration of a local area of the headset 1105. The mapping server 1125 receives, from the headset 1105 via the network 1120, information describing at least a portion of the local area and/or location information for the local area. The mapping server 1125 determines, based on the received information and/or location information, a location in the virtual model that is associated with the local area of the headset 1105. The mapping server 1125 determines (e.g., retrieves) one or more acoustic parameters associated with the local area, based in part on the determined location in the virtual model and any acoustic parameters associated with the determined location. The mapping server 1125 may transmit the location of the local area and any values of acoustic parameters associated with the local area to the headset 1105.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving an image including an ear of a user;
generating a three-dimensional (3-D) representation of the ear of the user based in part on the received image;
performing a simulation of sound propagation from an audio source to the ear of the user based on the 3-D representation, the simulating generating a simulated frequency response of audio output from the audio source at the ear of the user; and
generating an equalization filter for the user based on a ratio between the simulated frequency response of audio output from the audio source at the ear of the user and a target frequency response, the equalization filter configured to adjust one or more acoustic parameters of audio content provided to the user.

2. The method of claim 1, wherein the user is wearing a headset in the image of the ear of the user, and wherein generating the 3-D representation of the ear of the user further comprises generating a 3-D representation that includes the headset.

3. The method of claim 1, wherein the audio source is a speaker array of a headset.

4. The method of claim 1, wherein generating the 3-D representation comprises processing the image of the ear of the user using a machine learning model to obtain the 3-D representation.

5. The method of claim 4, wherein the 3-D representation is generated using a principal component analysis (PCA) model describing the ear of the user as a combination of representative three-dimensional shapes of test subjects' ears.

6. The method of claim 5, wherein the PCA model is generated by:
receiving ear images of test subjects and measured audio output responses of the test subjects;
determining PCA-based 3-D representations of the test subjects' ear images based on an initial PCA model;
performing simulation on the PCA-based 3-D representation to determine simulated audio output responses of the test subjects;
determining differences between the simulated audio output responses and the measured audio output responses;
generating, based on the determined differences, an updated PCA model by modifying the initial PCA model or by updating one or more intermediate PCA models derived from the initial PCA model; and
determining the updated PCA model as the PCA model for representing the ear of the user when the determined differences is below a threshold.

7. The method of claim 6, further comprising:
training the machine learning model using the ear images of the test subjects and PCA-based 3-D representations of the test subjects' ear images according to the PCA model.

8. The method of claim 1, wherein the image of the ear of the user is captured by a depth camera assembly of a headset.

9. The method of claim 1, wherein the generated 3-D representation comprises a three-dimensional mesh of the ear of the user.

10. The method of claim 1, further comprising:
providing the generated equalization filter to a headset configured to employ the equalization filter to provide audio content to the user.

11. The method of claim 1, further comprising:
providing the generated equalization filter to an online system, wherein the online system stores the generated equalization filter in association with an online profile of the user.

12. A non-transitory computer readable storage medium storing instructions thereon, the instructions when executed by a processor cause the processor to perform steps comprising:
receiving an image including an ear of a user;
generating a 3-D representation of the ear of the user based in part on the received image;
performing a simulation of sound propagation from an audio source to the ear of the user based on the 3-D representation, the simulation generating a simulated frequency response of audio output from the audio source at the ear of the user; and
generating an equalization filter for the user based on a ratio between the simulated frequency response of audio output from the audio source at the ear of the user and a target frequency response, the equalization filter adjusting one or more acoustic parameters of audio content provided to the user.

13. The non-transitory computer readable storage medium of claim 12, wherein the user is wearing a headset in the image of the ear of the user, and wherein generating the 3-D representation of the ear of the user further comprises generating a 3-D representation of the headset.

14. The non-transitory computer readable storage medium of claim 12, wherein the audio source is a speaker array of a headset.

15. The non-transitory computer readable storage medium of claim 12, wherein the simulation is based on one of a finite element method (FEM), a boundary element method (BEM), and a finite-difference time-domain (FDTD) method, and wherein the simulation of sound propagation from the audio source to the ear of the user simulates an audio output at the ear of the user.

16. The non-transitory computer readable storage medium of claim 12, the steps further comprising:
providing the generated equalization filter to a headset configured to use the equalization filter to provide audio content to the user.

17. The non-transitory computer readable storage medium of claim 12, the steps further comprising:
providing the generated equalization filter to an online system configured to append the generated equalization filter to an online profile of the user.

* * * * *